US008552999B2

(12) United States Patent
Dale et al.

(10) Patent No.: US 8,552,999 B2
(45) Date of Patent: Oct. 8, 2013

(54) CONTROL SELECTION APPROXIMATION

(75) Inventors: Thomas Andrew Cooke Dale, San Francisco, CA (US); Christopher Brian Fleizach, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 517 days.

(21) Appl. No.: 12/892,848

(22) Filed: Sep. 28, 2010

(65) Prior Publication Data
US 2011/0304560 A1 Dec. 15, 2011

Related U.S. Application Data

(60) Provisional application No. 61/354,666, filed on Jun. 14, 2010.

(51) Int. Cl.
G06F 3/041 (2006.01)
G06F 3/048 (2013.01)

(52) U.S. Cl.
USPC ........... 345/173; 715/810; 715/764; 715/759; 715/862

(58) Field of Classification Search
None
See application file for complete search history.

(56) References Cited

U.S. PATENT DOCUMENTS

| | | | |
|---|---|---|---|
| 4,455,452 A | 6/1984 | Schuyler | |
| 5,252,951 A | 10/1993 | Tannenbaum et al. | |
| 5,488,204 A | 1/1996 | Mead et al. | 178/18 |
| 5,513,309 A | 4/1996 | Meier et al. | |
| 5,534,893 A | 7/1996 | Hansen, Jr. et al. | 345/179 |
| 5,566,337 A | 10/1996 | Szymanski et al. | 395/733 |
| 5,589,856 A | 12/1996 | Stein et al. | |
| 5,627,567 A | 5/1997 | Davidson | |
| 5,627,959 A | 5/1997 | Brown et al. | 395/356 |
| 5,686,940 A | 11/1997 | Kuga | |
| 5,708,460 A | 1/1998 | Young et al. | |
| 5,745,116 A | 4/1998 | Pisutha-Arnond | 345/358 |

(Continued)

FOREIGN PATENT DOCUMENTS

| | | |
|---|---|---|
| CN | 1841284 | 10/2006 |
| EP | 1 517 228 A2 | 3/2005 |

(Continued)

OTHER PUBLICATIONS

Office Action dated Sep. 15, 2011, received in U.S. Appl. No. 12/042,318 (Beaver).

(Continued)

*Primary Examiner* — Bipin Shalwala
*Assistant Examiner* — Kwin Xie
(74) *Attorney, Agent, or Firm* — Morgan, Lewis & Bockius LLP

(57) ABSTRACT

A method includes displaying a user interface of an application on a device's touch-sensitive display. The user interface includes a plurality of regions, including a respective region at a respective hierarchy level. The respective region has two or more child regions at a hierarchy level below the respective hierarchy level. The method includes detecting a first contact at a location that corresponds to the respective region and that does not correspond to any of the two or more child regions. When the application is configured to process the first contact, not in conjunction with the respective region, but in conjunction with at least one child region of the two or more child regions, the method includes identifying a respective child region in accordance with positions of the child regions relative to the location, and processing the first contact in conjunction with the identified respective child region using the application.

30 Claims, 12 Drawing Sheets

(56) References Cited

U.S. PATENT DOCUMENTS

| | | | |
|---|---|---|---|
| 5,798,752 A * | 8/1998 | Buxton et al. | 715/863 |
| 5,818,455 A | 10/1998 | Stone et al. | |
| 5,880,411 A | 3/1999 | Gillespie et al. | 178/18.01 |
| 5,903,902 A | 5/1999 | Orr et al. | 707/517 |
| 5,917,477 A | 6/1999 | Lee | 345/173 |
| 6,028,602 A | 2/2000 | Weidenfeller et al. | 345/340 |
| 6,188,391 B1 | 2/2001 | Seely et al. | 345/173 |
| 6,259,436 B1 | 7/2001 | Moon et al. | 345/173 |
| 6,323,846 B1 | 11/2001 | Westerman et al. | 345/173 |
| 6,369,821 B2 | 4/2002 | Merrill et al. | |
| 6,446,083 B1 | 9/2002 | Leight et al. | |
| 6,486,896 B1 | 11/2002 | Ubillos | 345/784 |
| 6,570,557 B1 | 5/2003 | Westerman et al. | 345/173 |
| 6,570,594 B1 | 5/2003 | Wagner | |
| 6,590,595 B1 | 7/2003 | Wagner et al. | |
| 6,636,242 B2 | 10/2003 | Bowman-Amuah | |
| 6,639,584 B1 | 10/2003 | Li | 345/173 |
| 6,664,989 B1 | 12/2003 | Snyder et al. | 345/856 |
| 6,677,932 B1 | 1/2004 | Westerman | 345/173 |
| 6,677,965 B1 | 1/2004 | Ullmann et al. | 345/786 |
| 6,714,936 B1 | 3/2004 | Nevin, III | |
| 6,735,583 B1 | 5/2004 | Bjarnestam et al. | |
| 6,741,996 B1 | 5/2004 | Brechner et al. | 707/102 |
| 6,765,557 B1 | 7/2004 | Segal et al. | 345/173 |
| 6,778,992 B1 | 8/2004 | Searle et al. | |
| 6,839,721 B2 | 1/2005 | Schwols | 707/200 |
| 6,903,927 B2 | 6/2005 | Anlauff | 361/681 |
| 6,957,392 B2 | 10/2005 | Simister et al. | 715/746 |
| 6,958,749 B1 | 10/2005 | Matsushita et al. | 345/175 |
| 6,963,937 B1 | 11/2005 | Kamper et al. | |
| 6,985,137 B2 | 1/2006 | Kaikuranta | |
| 6,985,178 B1 | 1/2006 | Morita et al. | |
| 7,009,626 B2 | 3/2006 | Anwar | 345/660 |
| 7,013,435 B2 | 3/2006 | Gallo et al. | |
| 7,023,427 B2 | 4/2006 | Kraus et al. | 345/173 |
| 7,084,859 B1 | 8/2006 | Pryor | |
| 7,088,374 B2 | 8/2006 | David et al. | 345/619 |
| 7,117,453 B2 | 10/2006 | Drucker et al. | 715/833 |
| 7,152,210 B1 | 12/2006 | Van Den Hoven et al. | |
| 7,173,623 B2 | 2/2007 | Calkins et al. | 345/473 |
| 7,337,412 B2 | 2/2008 | Guido et al. | 715/853 |
| 7,346,850 B2 | 3/2008 | Swartz et al. | 715/763 |
| 7,385,592 B2 * | 6/2008 | Collins | 345/173 |
| 7,487,447 B1 | 2/2009 | Jerger | |
| 7,499,027 B2 | 3/2009 | Brigham, II et al. | |
| 7,561,159 B2 | 7/2009 | Abel et al. | 345/473 |
| 7,576,732 B2 | 8/2009 | Lii | 345/173 |
| 7,614,008 B2 | 11/2009 | Ording | |
| 7,653,883 B2 | 1/2010 | Hotelling et al. | |
| 7,663,607 B2 | 2/2010 | Hotelling et al. | |
| 7,673,255 B2 | 3/2010 | Schechter et al. | |
| 7,750,893 B2 | 7/2010 | Hashimoto et al. | |
| 7,843,427 B2 * | 11/2010 | Ording et al. | 345/157 |
| 7,844,915 B2 | 11/2010 | Platzer et al. | |
| 7,864,037 B2 | 1/2011 | Miller | |
| 7,872,652 B2 | 1/2011 | Platzer et al. | |
| 7,900,156 B2 | 3/2011 | Andre et al. | |
| 7,903,115 B2 | 3/2011 | Platzer et al. | |
| 7,917,584 B2 | 3/2011 | Arthursson | |
| 7,925,996 B2 | 4/2011 | Hofmeister et al. | |
| 7,941,760 B2 | 5/2011 | Kocienda et al. | |
| 7,962,862 B2 * | 6/2011 | Kulp et al. | 715/856 |
| 7,966,578 B2 | 6/2011 | Tolmasky et al. | |
| 8,051,406 B2 | 11/2011 | Knight et al. | |
| 8,091,045 B2 | 1/2012 | Christie et al. | |
| 8,115,744 B2 | 2/2012 | Kong et al. | |
| 8,135,171 B2 | 3/2012 | No et al. | |
| 8,140,570 B2 | 3/2012 | Ingrassia et al. | |
| 8,171,432 B2 | 5/2012 | Matas et al. | |
| 8,174,502 B2 | 5/2012 | Bolsinga et al. | |
| 8,214,768 B2 | 7/2012 | Boule et al. | |
| 8,239,784 B2 | 8/2012 | Hotelling et al. | |
| 8,253,695 B2 | 8/2012 | Ganatra et al. | |
| 8,285,499 B2 | 10/2012 | Moore et al. | |
| 8,289,289 B2 | 10/2012 | Rimon et al. | |
| 8,291,344 B2 | 10/2012 | Chaudhri | |
| 8,296,332 B2 | 10/2012 | Boley et al. | |
| 8,310,459 B2 | 11/2012 | Nurmi | |
| 8,314,775 B2 | 11/2012 | Westerman et al. | |
| 2001/0011998 A1 | 8/2001 | Agata et al. | |
| 2001/0012001 A1 | 8/2001 | Rekimoto et al. | |
| 2001/0045949 A1 | 11/2001 | Chithambaram et al. | 345/418 |
| 2002/0015024 A1 | 2/2002 | Westerman et al. | |
| 2002/0191029 A1 | 12/2002 | Gillespie et al. | |
| 2002/0194589 A1 | 12/2002 | Cristofalo et al. | 725/32 |
| 2003/0071850 A1 | 4/2003 | Geidl | |
| 2003/0071858 A1 | 4/2003 | Morohoshi | 345/856 |
| 2003/0080946 A1 | 5/2003 | Chuang | |
| 2003/0095096 A1 | 5/2003 | Robbin et al. | 345/156 |
| 2003/0122787 A1 | 7/2003 | Zimmerman et al. | 345/173 |
| 2003/0132959 A1 | 7/2003 | Simister et al. | 345/746 |
| 2003/0146941 A1 | 8/2003 | Bailey et al. | |
| 2003/0160832 A1 | 8/2003 | Ridgley et al. | 345/854 |
| 2003/0174149 A1 | 9/2003 | Fujisaki et al. | 345/684 |
| 2003/0197689 A1 | 10/2003 | May | 345/173 |
| 2003/0222917 A1 | 12/2003 | Trantow | |
| 2004/0021676 A1 | 2/2004 | Chen et al. | 345/684 |
| 2004/0021698 A1 | 2/2004 | Baldwin et al. | 345/853 |
| 2004/0027398 A1 | 2/2004 | Jaeger | |
| 2004/0039474 A1 | 2/2004 | Kontani | |
| 2004/0095387 A1 | 5/2004 | Demsey et al. | |
| 2004/0100479 A1 | 5/2004 | Nakano et al. | 345/700 |
| 2004/0125136 A1 | 7/2004 | Wallenius | |
| 2004/0160419 A1 | 8/2004 | Padgitt | 345/173 |
| 2004/0215643 A1 | 10/2004 | Brechner et al. | 707/100 |
| 2004/0222992 A1 | 11/2004 | Calkins et al. | 345/473 |
| 2004/0224638 A1 | 11/2004 | Fadell et al. | 455/66.1 |
| 2005/0005241 A1 | 1/2005 | Hunleth et al. | |
| 2005/0008343 A1 | 1/2005 | Frohlich et al. | |
| 2005/0017957 A1 | 1/2005 | Yi | |
| 2005/0024341 A1 | 2/2005 | Gillespie et al. | |
| 2005/0027666 A1 | 2/2005 | Beck, Jr. et al. | |
| 2005/0057524 A1 | 3/2005 | Hill et al. | 345/173 |
| 2005/0088443 A1 | 4/2005 | Blanco et al. | 345/473 |
| 2005/0162402 A1 | 7/2005 | Watanachote | 345/173 |
| 2005/0193015 A1 | 9/2005 | Logston et al. | 707/104.1 |
| 2005/0268247 A1 | 12/2005 | Baneth | |
| 2006/0010400 A1 | 1/2006 | Dehlin et al. | 715/856 |
| 2006/0026521 A1 | 2/2006 | Hotelling et al. | 715/702 |
| 2006/0026535 A1 | 2/2006 | Hotelling et al. | |
| 2006/0026536 A1 | 2/2006 | Hotelling et al. | |
| 2006/0028455 A1 | 2/2006 | Hinckley et al. | |
| 2006/0031786 A1 | 2/2006 | Hillis et al. | |
| 2006/0036955 A1 | 2/2006 | Baudisch et al. | 715/747 |
| 2006/0038796 A1 | 2/2006 | Hinckley et al. | 345/173 |
| 2006/0066588 A1 | 3/2006 | Lyon et al. | |
| 2006/0097991 A1 | 5/2006 | Hotelling et al. | 345/173 |
| 2006/0112335 A1 | 5/2006 | Hofmeister et al. | |
| 2006/0123353 A1 | 6/2006 | Matthews et al. | |
| 2006/0125799 A1 | 6/2006 | Hillis et al. | |
| 2006/0125803 A1 | 6/2006 | Westerman et al. | |
| 2006/0136833 A1 | 6/2006 | Dettinger et al. | |
| 2006/0161871 A1 | 7/2006 | Hotelling et al. | 715/863 |
| 2006/0190833 A1 | 8/2006 | SanGiovanni et al. | 715/767 |
| 2006/0197753 A1 | 9/2006 | Hotelling | 345/173 |
| 2006/0236263 A1 | 10/2006 | Bathiche et al. | 715/786 |
| 2006/0242602 A1 | 10/2006 | Schechter et al. | |
| 2006/0242607 A1 | 10/2006 | Hudson | |
| 2006/0279548 A1 | 12/2006 | Geaghan | |
| 2006/0284792 A1 | 12/2006 | Foxlin | |
| 2007/0046643 A1 | 3/2007 | Hillis et al. | |
| 2007/0050469 A1 | 3/2007 | Gupta et al. | |
| 2007/0055967 A1 | 3/2007 | Poff et al. | 717/162 |
| 2007/0061126 A1 | 3/2007 | Russo et al. | |
| 2007/0064004 A1 | 3/2007 | Bonner et al. | |
| 2007/0075965 A1 | 4/2007 | Huppi et al. | 345/156 |
| 2007/0081726 A1 | 4/2007 | Westerman et al. | |
| 2007/0089069 A1 * | 4/2007 | Hsieh et al. | 715/810 |
| 2007/0152976 A1 | 7/2007 | Townsend et al. | |
| 2007/0152984 A1 | 7/2007 | Ording et al. | |
| 2007/0174257 A1 | 7/2007 | Howard | 707/3 |
| 2007/0176903 A1 | 8/2007 | Dahlin et al. | |
| 2007/0185876 A1 | 8/2007 | Mendis et al. | 707/10 |
| 2007/0214462 A1 | 9/2007 | Boillot | |

(56) References Cited

U.S. PATENT DOCUMENTS

| | | |
|---|---|---|
| 2007/0242056 A1 | 10/2007 | Engelhardt et al. |
| 2007/0247435 A1 | 10/2007 | Benko et al. |
| 2007/0247442 A1 | 10/2007 | Andre et al. |
| 2007/0252821 A1 | 11/2007 | Hollemans et al. ............ 345/173 |
| 2007/0262964 A1 | 11/2007 | Zotov et al. |
| 2007/0277124 A1 | 11/2007 | Shin et al. |
| 2007/0288856 A1 | 12/2007 | Butlin et al. ................. 715/762 |
| 2007/0291009 A1 | 12/2007 | Wright et al. |
| 2008/0001923 A1 | 1/2008 | Hall et al. |
| 2008/0005703 A1 | 1/2008 | Radivojevic et al. ......... 715/863 |
| 2008/0012835 A1 | 1/2008 | Rimon et al. |
| 2008/0016096 A1 | 1/2008 | Wilding et al. ............... 707/101 |
| 2008/0028327 A1 | 1/2008 | Hirota et al. |
| 2008/0034029 A1 | 2/2008 | Fang et al. .................... 709/203 |
| 2008/0036743 A1 | 2/2008 | Westerman et al. |
| 2008/0043020 A1 | 2/2008 | Snow et al. |
| 2008/0048978 A1 | 2/2008 | Trent, Jr. et al. .............. 345/157 |
| 2008/0094368 A1 | 4/2008 | Ording et al. ................. 345/173 |
| 2008/0114614 A1 | 5/2008 | Mahesh et al. |
| 2008/0120576 A1 | 5/2008 | Kariathungal et al. |
| 2008/0158191 A1 | 7/2008 | Yang et al. |
| 2008/0165132 A1 | 7/2008 | Weiss et al. ................... 345/173 |
| 2008/0165136 A1 | 7/2008 | Christie et al. |
| 2008/0165141 A1 | 7/2008 | Christie et al. |
| 2008/0165160 A1 | 7/2008 | Kocienda et al. |
| 2008/0168395 A1 | 7/2008 | Ording et al. ................. 715/833 |
| 2008/0168405 A1 | 7/2008 | Tolmasky et al. |
| 2008/0172633 A1 | 7/2008 | Jeon et al. |
| 2008/0218489 A1 | 9/2008 | Park et al. ..................... 345/173 |
| 2008/0231610 A1 | 9/2008 | Hotelling et al. ............. 345/173 |
| 2009/0049388 A1 | 2/2009 | Taib et al. ..................... 715/738 |
| 2009/0051671 A1 | 2/2009 | Konstas |
| 2009/0058830 A1 | 3/2009 | Herz et al. |
| 2009/0207140 A1 | 8/2009 | Hansson ....................... 345/173 |
| 2009/0211891 A1 | 8/2009 | Lai et al. ....................... 200/512 |
| 2009/0225037 A1 | 9/2009 | Williamson et al. .......... 345/173 |
| 2009/0225038 A1 | 9/2009 | Bolsinga et al. .............. 345/173 |
| 2009/0225039 A1 | 9/2009 | Williamson et al. .......... 345/173 |
| 2009/0228828 A1 | 9/2009 | Beatty et al. |
| 2009/0228901 A1 | 9/2009 | Beaver et al. |
| 2009/0231281 A1 | 9/2009 | Whytock et al. |
| 2009/0251434 A1 | 10/2009 | Rimon et al. |
| 2009/0259969 A1 | 10/2009 | Pallakoff ....................... 715/808 |
| 2009/0262087 A1 | 10/2009 | Kim |
| 2009/0273571 A1 | 11/2009 | Bowens |
| 2009/0282332 A1 | 11/2009 | Porat |
| 2009/0284479 A1 | 11/2009 | Dennis et al. |
| 2009/0309847 A1 | 12/2009 | Russell et al. |
| 2009/0322687 A1 | 12/2009 | Duncan et al. |
| 2009/0322699 A1 | 12/2009 | Hansson ....................... 345/174 |
| 2009/0322700 A1 | 12/2009 | D'Souza et al. .............. 345/174 |
| 2010/0013676 A1 | 1/2010 | Do et al. |
| 2010/0020025 A1 | 1/2010 | Lemort et al. |
| 2010/0020221 A1 | 1/2010 | Tupman et al. .......... 348/333.01 |
| 2010/0046850 A1 | 2/2010 | Ho et al. |
| 2010/0107116 A1 | 4/2010 | Rieman et al. |
| 2010/0146458 A1 | 6/2010 | Wadekar ....................... 715/863 |
| 2010/0149122 A1 | 6/2010 | Lin ................................ 345/173 |
| 2010/0156804 A1 | 6/2010 | Young |
| 2010/0177053 A2 | 7/2010 | Yasutake |
| 2010/0182248 A1 | 7/2010 | Chun |
| 2010/0235118 A1 | 9/2010 | Moore et al. |
| 2010/0245267 A1 | 9/2010 | Min et al. |
| 2010/0267449 A1 | 10/2010 | Gagner et al. |
| 2010/0281435 A1 | 11/2010 | Bangalore et al. |
| 2010/0283739 A1 | 11/2010 | Zhang et al. |
| 2011/0037714 A1 | 2/2011 | Seo et al. |
| 2011/0047459 A1 | 2/2011 | Van Der Westhuizen |
| 2011/0115745 A1 | 5/2011 | Cabrera Cordon et al. |
| 2011/0179380 A1 | 7/2011 | Shaffer et al. |
| 2011/0179386 A1 | 7/2011 | Shaffer et al. |
| 2011/0179387 A1 | 7/2011 | Shaffer et al. |
| 2011/0181526 A1 | 7/2011 | Shaffer et al. |
| 2011/0252368 A1 | 10/2011 | Anzures et al. |
| 2011/0291951 A1 | 12/2011 | Tong |
| 2011/0310046 A1 | 12/2011 | Beaver et al. |
| 2011/0310047 A1 | 12/2011 | Moore et al. |
| 2011/0321125 A1 | 12/2011 | Kyohgoku et al. |
| 2012/0278725 A1 | 11/2012 | Gordon et al. |
| 2013/0016039 A1 | 1/2013 | Moore et al. |

FOREIGN PATENT DOCUMENTS

| | | |
|---|---|---|
| EP | 2 141 576 A2 | 1/2010 |
| EP | 2 184 673 A1 | 5/2010 |
| EP | 2 390 766 A1 | 11/2011 |
| GB | 2 319 591 A | 5/1998 |
| GB | 2 351 639 A | 1/2001 |
| JP | 05 298002 | 11/1993 |
| JP | 2001 290585 | 10/2001 |
| JP | 2005 056286 | 3/2005 |
| JP | 2005 082086 | 3/2005 |
| JP | 2005 242669 | 9/2005 |
| JP | 2008 146165 | 6/2008 |
| WO | WO 02/08881 A2 | 1/2002 |
| WO | WO 02/13176 A2 | 2/2002 |
| WO | WO 2006/020305 A2 | 2/2006 |
| WO | WO 2006/067711 A2 | 6/2006 |
| WO | WO 2006/094308 A2 | 9/2006 |
| WO | WO 2006/128248 A1 | 12/2006 |
| WO | WO 2007/037806 A1 | 4/2007 |
| WO | WO 2007/079425 A2 | 7/2007 |
| WO | WO 2007/089766 A2 | 8/2007 |
| WO | WO 2008/030879 A2 | 3/2008 |
| WO | WO 2008/030880 A1 | 3/2008 |
| WO | WO 2008/085846 A2 | 7/2008 |
| WO | WO 2008/085848 A1 | 7/2008 |
| WO | WO 2008/085855 A1 | 7/2008 |
| WO | WO 2008/085871 A1 | 7/2008 |
| WO | WO 2008/085877 A1 | 7/2008 |
| WO | WO 2009/018314 A2 | 2/2009 |
| WO | WO 2009/111189 A1 | 9/2009 |
| WO | WO 2009/111458 A1 | 9/2009 |
| WO | WO 2009/111460 A1 | 9/2009 |
| WO | WO 2009/111469 A1 | 9/2009 |

OTHER PUBLICATIONS

Office Action dated Aug. 9, 2011, received in Australian Patent Application No. 2009200493, which corresponds to U.S. Appl. No. 12/042,318 (Beaver).

Office Action dated Aug. 26, 2011, received in Japanese Patent Application No. 2009-080377, which corresponds to U.S. Appl. No. 12/042,318 (Beaver).

Office Action dated Aug. 3, 2011, received in Japanese Patent Application No. 2010 502358, which corresponds to U.S. Appl. No. 12/042,299 (Williamson).

Office Action dated Sep. 14, 2011, received in U.S. Appl. No. 12/042,237 (Bolsinga).

Office Action dated Jul. 14, 2011, received in Chinese Patent Application No. 200980000015.5, which corresponds to U.S. Appl. No. 12/042,237 (Bolsinga).

KennyTM, "UIGestureRecognizer," from iPhone Development Wiki, Oct. 31, 2009, 3 pages, http://iphonedevwiki.net/index.php?title=UIGestureRecognizer&oldid=319http://iphonedevwiki.net/index.php?title=UIGestureRecognizer&action=history.

Räihä, L., "Delegation: Dynamic Specialization," Proceeding of the conference on TRI-Ada '94, pp. 172-179.

Rogers, M., "It's for You! An iPhone Development Primer for the Busy College Professor," Journal of Computing Sciences in Colleges, vol. 25, No. 1, Oct. 1, 2009, pp. 94-101.

International Search Report and Written Opinion dated May 20, 2011, received in International Application No. PCT/US2011/022516, which corresponds to U.S. Appl. No. 12/789,695.

Office Action dated Feb. 25, 2011, received in Australian Patent Application No. 2009200493, which corresponds to U.S. Appl. No. 12/042,318.

Grant for Invention Patent dated Mar. 22, 2011, received in Chinese Patent Application No. ZL200910118596.4, which corresponds to U.S. Appl. No. 12/042,318.

(56) References Cited

OTHER PUBLICATIONS

Office Action dated Mar. 2, 2011, received in European Patent Application No. 11150786.9, which corresponds to U.S. Appl. No. 12/042,318.
Final Office Action dated Jul. 28, 2011, received in U.S. Appl. No. 12/042,067.
Final Office Action dated Jul. 8, 2011, received in U.S. Appl. No. 12/042,299.
Anonymous, "Firegestures," Internet Article, Oct. 27, 2009, 2 pages, http://xuldev.org/firegestures/.
Anonymous, "Firegestures: Changelog," Internet Article, Oct. 28, 2009, 8 pages, http://xuldev.org/firegestures/changelog.php.
Anonymous, "Firegestures Version History," Internet Article, Oct. 28, 2009, 6 pages, http://addons.mozilla.org/en-US/firefox/addons/version/6366.
Holzner, "Built-in JavaScript Objects," JavaScript Complete, 1998, McGraw/Hill, New York, pp. 71-79.
Pixley, "Document Object Model (DOM) Level 2 Events Specifications Version 1.0," W3C Recommendation, pp. 1-47, Nov. 13, 2000.
Toshiyuki et al., "Elastic Graphical Interfaces for Precise Data Manipulation," ACM Conference on Human Factors in Computing Systems (CHI '95),Apr. 1995, Conference Companion, ACM press, pp. 143-144.
Invitation to Pay Additional Fees dated Jul. 13, 2010, received in International Application No. PCT/US2010/027118, which corresponds to U.S. Appl. No. 12/566,660.
International Search Report and Written Opinion dated Oct. 5, 2010, received in International Application No. PCT/US2010/027118, which corresponds to U.S. Appl. No. 12/566,660.
International Search Report and Written Opinion dated Jul. 31, 2008, received in International Application No. PCT/US2008/000058.
International Preliminary Report on Patentability dated Jul. 7, 2009, received in International Application No. PCT/US2008/000058.
International Search Report and Written Opinion dated Apr. 22, 2008, received in International Application No. PCT/US2008/000060.
International Preliminary Report on Patentability dated Jul. 7, 2009, received in International Application No. PCT/US2008/000060.
International Search Report and Written Opinion dated May 2, 2008, received in International Application No. PCT/US2008/000069.
International Preliminary Report on Patentability dated Jul. 7, 2009, received in International Application No. PCT/US2008/000069.
International Search Report and Written Opinion dated Jun. 4, 2008, received in International Application No. PCT/US2008/000089, dated Jun. 4, 2008.
International Preliminary Report on Patentability dated Jul. 7, 2009, received in International Application No. PCT/US2008/000089.
International Search Report and Written Opinion dated Jun. 3, 2008, received in International Application No. PCT/US2008/000103.
International Preliminary Report on Patentability dated Jul. 7, 2009, received in International Application No. PCT/US2008/000103.
International Search Report and Written Opinion dated Jul. 3, 2009, received in International Application No. PCT/US2009/035856, which corresponds to U.S. Appl. No. 12/042,067.
International Preliminary Report on Patentability dated Sep. 16, 2010, received in International Application No. PCT/US2009/035856, which corresponds to U.S. Appl. No. 12/042,067.
International Search Report and Written Opinion dated Nov. 11, 2009, received in International Application No. PCT/US2009/035874, which corresponds to U.S. Appl. No. 12/042,299.
International Preliminary Report on Patentability dated Sep. 16, 2010, received in International Application No. PCT/US2009/035874, which corresponds to U.S. Appl. No. 12/042,299.
International Search Report and Written Opinion dated Jul. 3, 2009, received in International Application No. PCT/US2009/035858.
International Preliminary Report on Patentability dated Sep. 16, 2010, received in International Application No. PCT/US2009/035858.

International Search Report dated Apr. 16, 2009, received in International Application No. PCT/US2009/034772, which corresponds to U.S. Appl. No. 12/042,318.
European Search Report dated Apr. 21, 2009, received in European Application No. 09154313.2, which corresponds to U.S. Appl. No. 12/042,318.
Office Action dated Apr. 1, 2009, received in U.S. Appl. No. 11/620,709.
Final Office Action dated Nov. 13, 2009, received in U.S. Appl. No. 11/620,709.
Office Action dated Jun. 9, 2010, received in U.S. Appl. No. 11/620,709.
Office Action dated Jul. 8, 2009, received in U.S. Appl. No. 11/620,717.
Office Action dated Dec. 29, 2009, received in U.S. Appl. No. 11/620,717.
Notice of Allowance dated Jul. 20, 2010, received in U.S. Appl. No. 11/620,717.
Office Action dated Apr. 1, 2009, received in U.S. Appl. No. 11/620,723.
Final Office Action dated Nov. 17, 2009, received in U.S. Appl. No. 11/620,723.
Office Action dated Jun. 8, 2010, received in U.S. Appl. No. 11/620,723.
Office Action dated Jan. 18, 2011, received in U.S. Appl. No. 12/042,067.
Office Action dated Oct. 19, 2010, received in German Patent Application No. 11 2009 000 001.0, which corresponds to U.S. Appl. No. 12/042,067.
Office Action dated Oct. 15, 2010, received in European Patent Application No. 09 700 006.1, which corresponds to U.S. Appl. No. 12/042,067.
Office Action dated Jan. 4, 2011, received in U.S. Appl. No. 12/042,299.
Office Action dated Aug. 10, 2010, received in German Patent Application No. 11 2009 000 003.7, which corresponds to U.S. Appl. No. 12/042,299.
Office Action dated Nov. 26, 2010, received in European Patent Application No. 09 700 007.9, which corresponds to U.S. Appl. No. 12/402,299.
Office Action dated Feb. 16, 2011, received in U.S. Appl. No. 12/042,318.
Allen, J., "Override the GNU C library—painlessly," ibm.com, Apr. 2002, 4 pages.
Chartier, D., "Apple releases iOS 4.3 beta for developers," Macworld.com, Jan. 12, 2011, http://www.macworld.com/article/1157114/ios_4_3.html, 7 pages.
International Preliminary Report on Patentability dated Sep. 20, 2011, received in International Application No. PCT/US2010/027118, which corresponds to U.S. Appl. No. 12/566,660, 10 pages (Moore).
Invitation to Pay Additional Fees dated Mar. 12, 2012, received in International Application No. PCT/US2011/065859, which corresponds to U.S. Appl. No. 13/077,925, 10 pages (Shaffer).
International Search Report and Written Opinion dated Jun. 1, 2012, received in International Application No. PCT/US2011/065859, which corresponds to U.S. Appl. No. 13/077,925, 22 pages (Shaffer).
European Search Report dated Jan. 13, 2012, received in European Patent Application No. 11184226.6, which corresponds to U.S. Appl. No. 12/042,299, 7 pages (Williamson).
European Search Report dated Jan. 13, 2012, received in European Patent Application No. 11184224.1, which corresponds to U.S. Appl. No. 12/042,299, 7 pages (Williamson).
Notice of Allowance dated May 24, 2012, received in U.S. Appl. No. 12/566,660, 10 pages (Moore).
Office Action dated Feb. 22, 2012, received in Australian Patent Application No. 2011205170, which corresponds to U.S. Appl. No. 12/042,318, 3 pages (Beaver).
Office Action dated May 3, 2012, received in U.S. Appl. No. 12/042,299, 14 pages (Williamson).
Decision to Grant dated Mar. 23, 2012, received in Japanese Patent Application No. 2010-502358, which corresponds to U.S. Appl. No. 12/042,299, 5 pages (Williamson).

(56) References Cited

OTHER PUBLICATIONS

Notice of Allowance dated Mar. 6, 2012, received in U.S. Appl. No. 12/042,237, 16 pages (Bolsinga).
Office Action dated Feb. 22, 2012, received in Chinese Patent Application No. 200980000015.5, which corresponds to U.S. Appl. No. 12/042,237, 9 pages (Bolsinga).
Office Action dated Jan. 16, 2012, received in Japanese Patent Application No. 2010-502357, which corresponds to U.S. Appl. No. 12/042,237, 2 pages (Bolsinga).
Notice of Allowance dated May 23, 2012, received in U.S. Appl. No. 13/221,830, 8 pages (Moore).
Office Action dated Jun. 20, 2012, received in U.S. Appl. No. 12/869,182, 18 pages (Platzer).
Final Office Action dated Mar. 12, 2012, received in U.S. Appl. No. 11/620,727, 21 pages (Blumenberg).
Final Office Action dated Jun. 20, 2012, received in U.S. Appl. No. 13/251,146, 28 pages (Blumenberg).
Office Action dated Jun. 18, 2012, received in U.S. Appl. No. 13/464,800, 10 pages (Bolsinga).
Pogue, D., "Windows Vista for Starters: The Missing Manual," Safari Books Online, Jan. 25, 2007. 18 pages.
Office Action dated Mar. 4, 2013, received in U.S. Appl. No. 12/789,695, 29 pages (Shaffer).
Office Action dated Jan. 21, 2013, received in Chinese Patent Application No. 201110148738.9, which corresponds sto U.S. Appl. No. 12/042,318, 17 pages (Beaver).
Certificate of Grant dated Nov. 30, 2012, received in Hong Kong Patent Application No. 11110416.2, which corresponds to U.S. Appl. No. 12/042,318, 1 page (Beaver).
Decision to Grant dated Nov. 27, 2012, received in Chinese Patent Application No. 200980000014.0, which corresponds to U.S. Appl. No. 12/042,067, 1 page (Williamson).
Notice of Allowance dated Dec. 12, 2012, received in U.S. Appl. No. 12/042,299, 12 pages (Williamson).
Office Action dated Dec. 5, 2012, received in Chinese Patent Application No. 200980000013.6, which corresponds to U.S. Appl. No. 12/042,299, 7 pages (Williamson).
Office Action dated Jan. 3, 2013, received in U.S. Appl. No. 13/077,931, 24 pages (Shaffer).
Notice of Allowance dated Dec. 3, 2012. received in U.S. Appl. No. 13/221,830, 17 pages (Moore).
Notice of Allowance dated Dec. 12, 2012, received in U.S. Appl. No. 12/869,182, 8 pages (Platzer).
Final Office Action dated Feb. 14, 2013, received in U.S. Appl. No. 13/221,837, 17 (Blumenberg).
Final Office Action dated Mar. 1, 2013, received in U.S. Appl. No. 11/620,715, 25 pages (Platzer).
Office Action dated Nov. 5, 2012, received in Chinese Patent Application No. 200880001855.9, which corresponds to U.S. Appl. No. 11/620,715, 22 pages (Platzer).
Notice of Allowance dated Dec. 19, 2012, received in U.S. Appl. No. 13/464,800, 11 pages (Bolsinga).
Office Action dated Mar. 5, 2013, received in U.S. Appl. No. 13/670,378, 40 pages (Beaver).
European Search Report dated Dec. 7, 2011, received in European Patent Application No. 11184186.2, which corresponds to U.S. Appl. No. 12/566,660 (Moore).
International Search Report and Written Opinion dated Dec. 13, 2011, received in International Patent Application No. PCT/US2011/039583, which corresponds to U.S. Appl. No. 12/892,848 (Dale).
European Search Report dated Nov. 23, 2011, received in European Patent Application No. 11184167.2, which corresponds to U.S. Appl. No. 12/042,318 (Beaver).
European Search Report dated Nov. 24, 2011, received in European Patent Application No. 11184169.8, which corresponds to U.S. Appl. No. 12/042,318 (Beaver).
European Search Report dated Nov. 18, 2011, received in European Patent Application No. 11184170.6, which corresponds to U.S. Appl. No. 12/042,318 (Beaver).
European Search Report dated Nov. 18, 2011, received in European Patent Application No. 11184172.2, which corresponds to U.S. Appl. No. 12/042,318 (Beaver).
European Search Report dated Nov. 30, 2011, received in European Patent Application No. 11184409.8, which corresponds to U.S. Appl. No. 12/042,318 (Beaver).
Office Action dated Dec. 9, 2011, received in U.S. Appl. No. 12/566,660 (Moore).
Office Action dated Dec. 13, 2011, received in Australian Patent Application No. 2011101154, which corresponds to U.S. Appl. No. 12/042,318 (Beaver).
Office Action dated Dec. 13, 2011, received in Australian Patent Application No. 2011101157, which corresponds to U.S. Appl. No. 12/042,318 (Beaver).
Office Action dated Dec. 13, 2011, received in Australian Patent Application No. 2011101156, which corresponds to U.S. Appl. No. 12/042,318 (Beaver).
Office Action dated Dec. 13, 2011, received in Australian Patent Application No. 2011101155, which corresponds to U.S. Appl. No. 12/042,318 (Beaver).
Office Action dated Oct. 19, 2011, received in Chinese Patent Application No. 200980000014.0, which corresponds to U.S. Appl. No. 12/042,067 (Williamson).
Office Action dated Oct. 24, 2011, received in Japanese Patent Application No. 2010-502356, which corresponds to U.S. Appl. No. 12/042,067 (Williamson).
Office Action dated Oct. 26, 2011, received in Chinese Patent Application No. 200980000013.6, which corresponds to U.S. Appl. No. 12/042,299 (Williamson).
Apple, "Safari Web Content Guide for iPhone," Apple Inc., Feb. 5, 2005, 96 pages.
Chen, T., "The Web is Everywhere," IEEE Communications Magazine, Feb. 5, 2008, 1 page.
Search Report dated Jun. 2012, received in Dutch Patent Application No. 2007993, which corresponds to U.S. Appl. No. 13/077,925, 6 pages (Shaffer).
European Search Report dated Jul. 9, 2012, received in European Patent Application No. 12156395.1, which corresponds to U.S. Appl. No. 12/042,318, 8 pages (Beaver).
Notice of Allowance dated Jul. 26, 2012, received in U.S. Appl. No. 12/566,660, 9 pages (Moore).
Patent Examination Report No. 1 dated Oct. 17, 2012, received in Australian Patent Application No. 2010226120, which corresponds to U.S. Appl. No. 12/566,660, 3 pages (Moore).
Notice of Allowance dated Nov. 2, 2012, received in Canadian Patent Application No. 2755443, which corresponds to U.S. Appl. No. 12/566,660, 1 page (Moore).
Office Action dated Oct. 22, 2012, received in Chinese Patent Application No. 201110063183.8, which corresponds to U.S. Appl. No. 12/789,695, 8 pages (Shaffer).
Office Action dated Oct. 9, 2012, received in U.S. Appl. No. 12/892,851, 22 pages (Dale).
Office Action dated Oct. 19, 2012, received in Chinese Patent Application No. 201120580018.5, which corresponds to U.S. Appl. No. 13/077,925, 4 pages (Shaffer).
Certificate of Examination dated May 7, 2012, received in Australian Patent No. 2011101154, which corresponds to U.S. Appl. No. 12/042,318, 1 page (Beaver).
Certificate of Examination dated May 8, 2012, received in Australian Patent No. 2011101157, which corresponds to U.S. Appl. No. 12/042,318, 1 page (Beaver).
Certificate of Examination dated May 8, 2012, received in Australian Patent No. 2011101156, which corresponds to U.S. Appl. No. 12/042,318, 1 page (Beaver).
Certificate of Examination dated May 8, 2012, received in Australian Patent No. 2011101155, which corresponds to U.S. Appl. No. 12/042,318, 1 page (Beaver).
Office Action dated Sep. 3, 2012, received in Australian Patent Application No. 2011265335, which corresponds to U.S. Appl. No. 12/042,318, 2 pages (Beaver).
Notice of Acceptance dated Nov. 8, 2012, received in Australian Patent Application No. 2011265335, which corresponds to U.S. Appl. No. 12/042,318, 3 pages (Beaver).

(56) References Cited

OTHER PUBLICATIONS

Decision to Grant dated Jul. 26, 2012, received in European Patent Application No. 11150786.9, which corresponds to U.S. Appl. No. 12/042,318, 1 pages (Beaver).
Decision to Grant dated Jul. 27, 2012, received in Japanese Patent Application No. 2009080377, which corresponds to U.S. Appl. No. 12/042,318, 4 pages (Beaver).
Office Action dated Jun. 13, 2012, received in Chinese Patent Application No. 200980000014.0, which corresponds to U.S. Appl. No. 12/042,067, 6 pages (Williamson).
Office Action dated Sep. 26, 2012, received in German Patent Application No. 11 2009 000 001.0, which corresponds to U.S. Appl. No. 12/042,067, 5 pages (Williamson).
Office Action dated Jun. 6, 2012, received in Chinese Patent Application No. 200980000013.6, which corresponds to U.S. Appl. No. 12/042,299, 7 pages (Williamson).
Office Action dated Oct. 19, 2012, received in German Patent Application No. 11 2009 000 003.7, which corresponds to U.S. Appl. No. 12/042,299, 5 pages (Williamson).
Office Action dated Sep. 12, 2012, received in European Patent Application No. 11184226.6, which corresponds to U.S. Appl. No. 12/402,299, 5 pages (Williamson).
Office Action dated Sep. 12, 2012, received in European Patent Application No. 11184224.1, which corresponds to U.S. Appl. No. 12/402,299, 4 pages (Williamson).
Office Action dated Sep. 12, 2012, received in European Patent Application No. 11184223.3, which corresponds to U.S. Appl. No. 12/402,299, 4 pages (Williamson).
Office Action dated Sep. 12, 2012, received in European Patent Application No. 11184222.5, which corresponds to U.S. Appl. No. 12/402,299, 4 pages (Williamson).
Office Action dated Nov. 21, 2012, received in U.S. Appl. No. 13/163,624, 29 pages (Williamson).
Office Action dated Nov. 26, 2012, received in U.S. Appl. No. 13/163,626, 29 pages (Williamson).
Office Action dated Sep. 11, 2012, received in Chinese Patent Application No. 200980000015.5, which corresponds to U.S. Appl. No. 12/042,237, 9 pages (Bolsinga).
Office Action dated Sep. 26, 2012, received in German Patent Application No. 11 2009 000 002.9, which corresponds to U.S. Appl. No. 12/042,237, 5 pages (Bolsinga).
Office Action dated Nov. 11, 2010, received in Chinese Patent Application No. 200880001827.7, which corresponds to U.S. Appl. No. 11/620,717, 6 pages (Platzer).
Office Action dated Jan. 29, 2012, received in Chinese Patent Application No. 2008800018227, which corresponds to U.S. Appl. No. 11/620,717, 5 pages (Platzer).
Office Action dated Aug. 15, 2012, received in U.S. Appl. No. 11/620,727, 19 pages (Blumenberg).
Office Action dated Nov. 5, 2012, received in U.S. Appl. No. 13/221,836, 31 pages (Blumenberg).
Office Action dated Jul. 24, 2012, received in U.S. Appl. No. 13/221,837, 25 pages (Blumenberg).
Final Office Action dated Jul. 9, 2012, received in U.S. Appl. No. 13/251,121, 30 pages (Blumenberg).
Final Office Action dated Jul. 5, 2012, received in U.S. Appl. No. 13/251,150, 36 pages (Blumenberg).
Final Office Action dated Jun. 20, 2012, received in U.S. Appl. No. 13/251,152, 24 pages (Blumenberg).
Office Action dated Aug. 29, 2012, received in U.S. Appl. No. 11/620,715. 20 pages (Platzer).
Office Action dated Jun. 6, 2012, received in Chinese Patent Application No. 200880001855.9, which corresponds to U.S. Appl. No. 11/620,715, (Platzer).
Office Action dated Oct. 30, 2012, received in European Patent Application No. 08 712 946.6, which corresponds to U.S. Appl. No. 11/620,715. 20 pages (Platzer).
Notice of Allowance dated Nov. 13, 2012, received in U.S. Appl. No. 13/464,800, 20 pages (Bolsinga).
Brown et al., "Distrubuted active objects," Computer Networks and ISDN Systems, North Holland Publishing, Amsterdam, NL, vol. 28, No. 11, May 1996, pp. 1037-1052.
Han, J., "Jeff Han demos his breakthrough touchscreen," TED ideas worth spreading, Feb. 25, 2006, http://www.ted.com/talks/jeff_han_demos_his_breakthrough_touchscreen.html.
Jazzmutant, "Lemar v1.3 Documentation Addendum," Mar. 22, 2002, http://www.juzzmutant.com/support_download,php, 3 pages.
Jazzmutant, "Lemur v.1.3 Examples package: Cursor Modes.xml," Jan. 31, 2006, http://www.juzzmutant.com/support_download.php, 4 pages.
Jazzmutant, "Lemur v1.3 Examples package: LightStepSeq.xml," Jan. 31, 2006, http://www.juzzmutant.com/support_download.php, 5 pages.
Jazzmutant Sas et al., "The Lemur Owner's Manual," Oct. 31, 2005, http://www/juzzmutant.com/support_download.php, 108 pages.
Jazzmutant, "Support," Apr. 21, 2006, http://web.archive.org/web/2060421144624/http://www.jazzmutant.com/support_download.php. 2 pages.
Justice Floyd, "UK Royal Court of Justice: [2012]EWCH 1789 (Pat)—Extracts," Jul. 4, 2013, http://www.judiciary.gov.uk/Resources/JCO/Documents/Judgements/htc-v-apple-judgement,pdf, 26 pages.
Microsoft, "Microsoft Windows Software Development Kit-Update for Windows Vista," Mar. 22, 2007, http://www.microsoft.com/en-us/download/details.aspx?displaylang=en&id=23719, 26 pages.
Microsoft "Window Styles-Microsoft Windows SDK-Screenshot," Mar. 22, 2007, 2 pages.
Petzold, C., "Programming Microsoft Windows with C#," Jan. 18, 2002, 5 pages.
W3C, "Document Object Model (DOM) Level 2 Events Specification, Version 1," W3C Recommendation, Nov. 13, 2000, 48 pages.
Wikibooks, "Java Programming/Applets/Event Listeners," May 1, 2007, http://en.wikibooks.org/w/index.php?title=Java_Programming/Applets/Event_Listeners&oldid=849558, 6 pages.
YouTube, "A Lemurized Formula," 4.07 minute video uploaded to YouTube by Sph9000 on Dec. 12, 2007, http://youtube.com/watch?v=SHAMyQak-LM, 1 page.
Summons to oral proceedings dated May 15, 2013, received in European Patent Application No. 09154313.2, which corresponds to U.S. Appl. No. 12/042,318, 30 pages (Beaver).
Office Action dated Mar. 14, 2013, received U.S. Appl. No. 12/042,067, 27 pages (Williamson).
Summons to oral proceedings dated Mar. 7, 2013, received in European Patent Application No. 09700008.1, which corresponds to U,S. Appl. No. 12/042,067, 5 pages (Williamson).
Office Action dated Mar. 22, 2013, received in U.S. Appl. No. 13/163,624, 11 pages (Williamson).
Office Action dated Mar. 20, 2013, received in U.S. Appl. No. 13/163,626, 10 pages (Williamson).
Summons to oral proceedings dated Mar. 27, 2013, received in European Patent Application No. 09700008.7, which corresponds to U.S. Appl. No. 12/042,237, 4 pages (BLumenberg).
Final Office Action dated Mar. 7, 2013, received in U.S. Appl. No. 11/620,727, 23 pages (Blumenberg).
Office Action dated Apr. 11, 2013, received in U S. Appl. No. 13/251,146, 35 pages (Blumenberg).
Office Action dated Mar. 7, 2013, received in Chinese Patent Application No. 200880001855.0, which corresponds to U.S. Appl. No. 11/620,715, 21 pages (Platzer).

* cited by examiner

Figure 4A

CONTROL SELECTION APPROXIMATION

RELATED APPLICATIONS

This application claims priority to U.S. Provisional Application Ser. No. 61/354,666, filed Jun. 14, 2010, entitled "Control Selection Approximation," which is incorporated herein by reference in its entirety.

This relates to the following applications: (1) U.S. Patent Application No. 12/892,851, filed Sep. 28, 2010, entitled "Control Selection Approximation" (2) U.S. patent application Ser. No. 12/789,695, filed May 28, 2010, entitled "Gesture Recognizers with Delegates for Controlling and Modifying Gesture Recognition," which in turn claims priority to U.S. Provisional Application No. 61/298,531, filed Jan. 26, 2010, entitled "Gesture Recognizers with Delegates for Controlling and Modifying Gesture Recognition;" and (3) U.S. patent application Ser. No. 12/566,660, filed Sep. 24, 2009, entitled "Event Recognition," now U.S. Pat. No. 8,285,499, which in turn claims priority to U.S. Provisional Patent Application No. 61/210,332, filed on Mar. 16, 2009, entitled "Event Recognition," which are incorporated herein by reference in their entirety.

TECHNICAL FIELD

This relates generally to user interface processing, including but not limited to, apparatuses and methods for recognizing touch inputs.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to select and/or manipulate user interface objects on a display.

Touch inputs are commonly based on finger contacts. However, the size of fingers (or fingertips) may make it challenging to accurately select user interface objects that are designed and sized for different user interface methods (e.g., traditional mouse-based inputs). In addition, user interface objects may be sized small for various reasons (e.g., provide more screen/display real estate such that more information can be displayed in a single view). Furthermore, people with temporary or permanent disability, handicap, or ailments (e.g., reduced visual perception and/or reduced motor skills) may have difficulty precisely selecting and/or manipulating user interface objects.

Thus, it would be desirable to have a comprehensive framework or mechanism for recognizing touch-based gestures and events, as well as gestures and events from other input sources, even if the touch-based gestures and events are detected outside intended user interface objects.

SUMMARY

To address the aforementioned drawbacks, in accordance with some embodiments, a method is performed at an electronic device having a touch-sensitive display. The method includes displaying on the touch-sensitive display a user interface of an application. The displayed user interface includes a plurality of regions that are arranged in multiple hierarchical levels. The plurality of regions includes a respective region at a respective hierarchy level. The respective region has two or more child regions at a hierarchy level below the respective hierarchy level. The method also includes detecting on the touch-sensitive display a first contact at a first location that corresponds to the respective region and that does not correspond to any of the two or more child regions of the respective region. The method includes, in response to detecting the first contact, determining whether the application is configured to process the first contact in conjunction with the respective region. The method further includes, when the application is not configured to process the first contact in conjunction with the respective region, determining whether the application is configured to process the first contact in conjunction with at least one child region of the two or more child regions of the respective region. The method includes, when the application is configured to process the first contact in conjunction with at least one child region of the two or more child regions of the respective region, identifying a respective child region of the two or more child regions of the respective region, in accordance with positions of the child regions relative to the first location, and processing the first contact in conjunction with the identified respective child region using the application.

In accordance with some embodiments, a method is performed at an electronic device having a touch-sensitive display. The method includes displaying on the touch-sensitive display a web page (or other document) including a plurality of activatable user interface objects. The method also includes detecting on the touch-sensitive display a first contact at a first location that corresponds to the displayed web page. The method includes, in response to detecting the first contact at the first location, determining whether the first location corresponds to at least one of the activatable user interface objects. The method further includes, when the first location does not correspond to at least one of the activatable user interface objects, identifying a user interface object, if any, that best satisfies a predefined rule with respect to the first location, and performing an action corresponding to the identified user interface object.

In accordance with some embodiments, an electronic device includes: a touch-sensitive display, one or more processors for executing programs, and memory storing one or more programs to be executed by the one or more processors. The one or more programs include instructions executed by the one or more processors so as to perform any of the aforementioned methods.

In accordance with some embodiments, a computer readable storage medium stores one or more programs configured for execution by one or more processors in an electronic device. The one or more programs include instructions for performing any of the aforementioned methods.

In accordance with some embodiments, an electronic device includes: a touch-sensitive display, one or more processors, and memory storing one or more programs for execution by the one or more processors. The one or more programs include instructions that when executed by the one or more processors cause the electronic device to display on the touch-sensitive display a user interface of an application. The displayed user interface includes a plurality of regions that are arranged in multiple hierarchical levels. The plurality of regions includes a respective region at a respective hierarchy level. The respective region has two or more child regions at a hierarchy level below the respective hierarchy level. The one or more programs also include instructions that when executed by the one or more processors cause the electronic device to detect on the touch-sensitive display a first contact at a first location that corresponds to the respective region and that does not correspond to any of the two or more child regions of the respective region. The one or more programs include instructions that when executed by the one or more processors cause the electronic device to, in response to detecting the first contact, determine whether the application is configured to process the first contact in conjunction with the respective region. The one or more programs include instructions that when executed by the one or more processors cause the electronic device to, when the application is not configured to process the first contact in conjunction with the respective region, determine whether the application is configured to process the first contact in conjunction with at least one child region of the two or more child regions of the respective region. The one or more programs further include instructions that when executed by the one or more processors cause the electronic device to, when the application is configured to process the first contact in conjunction with at least one child region of the two or more child regions of the respective region, identify a respective child region, of the two or more child regions of the respective region, in accordance with positions of the child regions relative to the first location, and process the first contact in conjunction with the identified respective child region using the application.

In accordance with some embodiments, a computer readable storage medium stores one or more programs for execution by one or more processors in an electronic device with a touch-sensitive display. The one or more programs include instructions that when executed by the one or more processors cause the electronic device to provide, for display on the touch-sensitive display, a user interface of an application. The displayed user interface includes a plurality of regions that are arranged in multiple hierarchical levels. The plurality of regions includes a respective region at a respective hierarchy level. The respective region has two or more child regions at a hierarchy level below the respective hierarchy level. The one or more programs also include instructions that when executed by the one or more processors cause the electronic device to, in response to detection of a first contact on the touch-sensitive display, determine whether the application is configured to process the first contact in conjunction with the respective region. The first contact at a first location corresponds to the respective region and does not correspond to any of the two or more child regions of the respective region. The one or more programs include instructions that when executed by the one or more processors cause the electronic device to, when the application is not configured to process the first contact in conjunction with the respective region, determine whether the application is configured to process the first contact in conjunction with at least one child region of the two or more child regions of the respective region. The one or more programs further include instructions that when executed by the one or more processors cause the electronic device to, when the application is configured to process the first contact in conjunction with at least one child region of the two or more child regions of the respective region, identify a respective child region, of the two or more child regions of the respective region, in accordance with positions of the child regions relative to the first location, and process the first contact in conjunction with the identified respective child region using the application.

In accordance with some embodiments, an electronic device includes: a touch-sensitive display, one or more processors, and memory storing one or more programs for execution by the one or more processors. The one or more programs include instructions that when executed by the one or more processors cause the electronic device to display on the touch-sensitive display a web page (or other document) including a plurality of activatable user interface objects, and detect on the touch-sensitive display a first contact at a first location that corresponds to the displayed web page. The one or more programs also include instructions that when executed by the one or more processors cause the electronic device to, in response to detecting the first contact at the first location, determine whether the first location corresponds to at least one of the activatable user interface objects. The one or more programs further include instructions that when executed by the one or more processors cause the electronic device to, when the first location does not correspond to at least one of the activatable user interface objects, identify a user interface object, if any, that best satisfies a proximity criterion with respect to the first location, and perform an action corresponding to the identified user interface object.

In accordance with some embodiments, a computer readable storage medium stores one or more programs for execution by one or more processors in an electronic device with a touch-sensitive display. The one or more programs include instructions that when executed by the one or more processors cause the electronic device to display on the touch-sensitive display a web page (or other document) including a plurality of activatable user interface objects, and detect on the touch-sensitive display a first contact at a first location that corresponds to the displayed web page. The one or more programs also include instructions that when executed by the one or more processors cause the electronic device to, in response to detecting the first contact at the first location, determine whether the first location corresponds to at least one of the activatable user interface objects. The one or more programs further include instructions that when executed by the one or more processors cause the electronic device to, when the first location does not correspond to at least one of the activatable user interface objects, identify a user interface object, if any, that best satisfies a proximity criterion with respect to the first location, and perform an action corresponding to the identified user interface object.

BRIEF DESCRIPTION OF THE DRAWINGS

FIGS. 4A-4C are exemplary user interfaces including a hierarchy of views, in accordance with some embodiments.

Like reference numerals refer to corresponding parts throughout the drawings.

DESCRIPTION OF EMBODIMENTS

Figure 1:
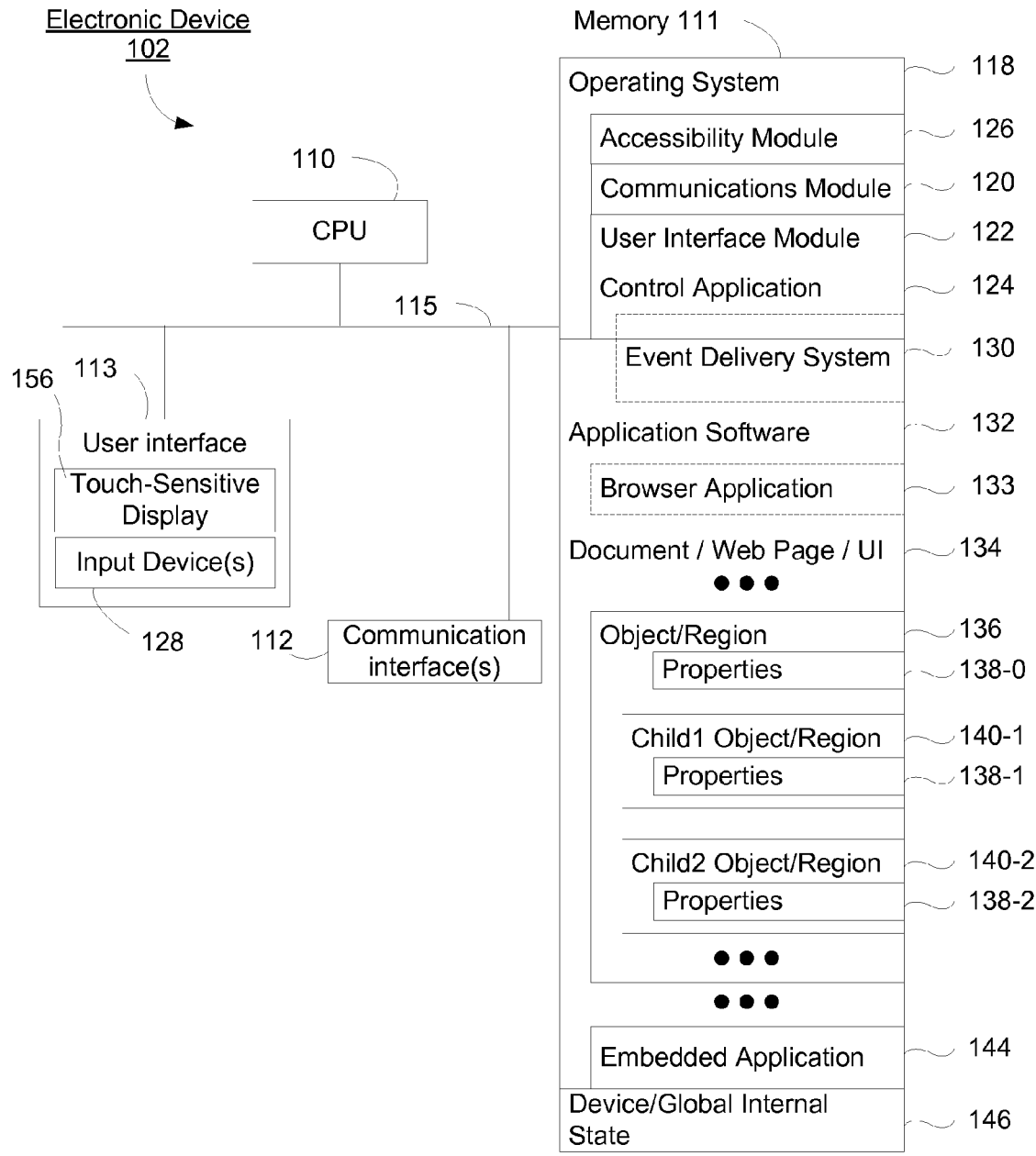
FIG. 1 is a block diagram illustrating an electronic device, in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term "event" refers to an input detected by one or more sensors of the device. In particular, the term "event" includes a touch on a touch-sensitive surface. An event comprises one or more sub-events. Sub-events typically refer to changes to an event (e.g., a touch-down, touch-move, and lift-off of the touch can be sub-events). Sub-events in the sequence of one or more sub-events can include many forms, including without limitation, key presses, key press holds, key press releases, button presses, button press holds, button press releases, joystick movements, mouse movements, mouse button presses, mouse button releases, pen stylus touches, pen stylus movements, pen stylus releases, finger contacts, finger movements, finger lift-offs, oral instructions, detected eye movements, biometric inputs, and detected physiological changes in a user, among others. Since an event may comprise a single sub-event (e.g., a finger contact on a touch-sensitive display), the term "sub-event" as used herein also refers to an event.

As used herein, the terms "event recognizer" and "gesture recognizer" are used interchangeably to refer to a recognizer that can recognize a gesture. In some embodiments, an event recognizer can recognize other events (e.g., motion of the device).

When using touch-based gestures to control an application running in a device having a touch-sensitive surface, touches have both temporal and spatial aspects. The temporal aspect, called a phase, indicates when a touch has just begun, whether it is moving or stationary, and when it ends—that is, when the finger is lifted from the screen. A spatial aspect of a touch is the set of views or user interface regions in which the touch occurs. The views or regions in which a touch is detected may correspond to programmatic levels within a view hierarchy. For example, the lowest level view in which a touch is detected is called the hit view, and the set of events that are recognized as proper inputs may be determined based, at least in part, on the hit view of the initial touch that begins a touch-based gesture.

FIG. 1 is a block diagram illustrating different embodiments of an electronic device 102, in accordance with some embodiments. The electronic device 102 may be any electronic device including, but not limited to, a desktop computer system, a laptop computer system, a netbook computer system, mobile phone, a smart phone, a personal digital assistant, or a navigation system. The electronic device may also be a portable electronic device with a touch screen display (e.g., touch-sensitive display 156) configured to present a user interface, a computer with a touch screen display configured to present a user interface, a computer with a touch sensitive surface and a display configured to present a user interface, or any other form of computing device, including without limitation, consumer electronic devices, mobile telephones, video game systems, electronic music players, tablet PCs, electronic book reading systems, e-books, PDAs, electronic organizers, email devices, laptops, netbooks or other computers, kiosk computers, vending machines, smart appliances, etc. The electronic device 102 includes a user interface 113.

Electronic device 102 includes a touch screen display (e.g., touch-sensitive display 156). In some embodiments, user interface 113 may include an on-screen keyboard (not depicted) that is used by a user to interact with electronic devices 102. In some embodiments, electronic device 102 also includes one or more input devices 128 (e.g., keyboard, mouse, trackball, microphone, physical button(s), touchpad, etc.). In some embodiments, touch-sensitive display 156 has the ability to detect two or more distinct, concurrent (or partially concurrent) touches, and in these embodiments, display 156 is sometimes herein called a multitouch display or multitouch-sensitive display.

When performing a touch-based gesture on touch-sensitive display 156 of electronic device 102, the user generates a sequence of sub-events that are processed by one or more CPUs 110 of electronic device 102. In some embodiments, one or more CPUs 110 of electronic device 102 process the sequence of sub-events to recognize events.

Figure 5A:
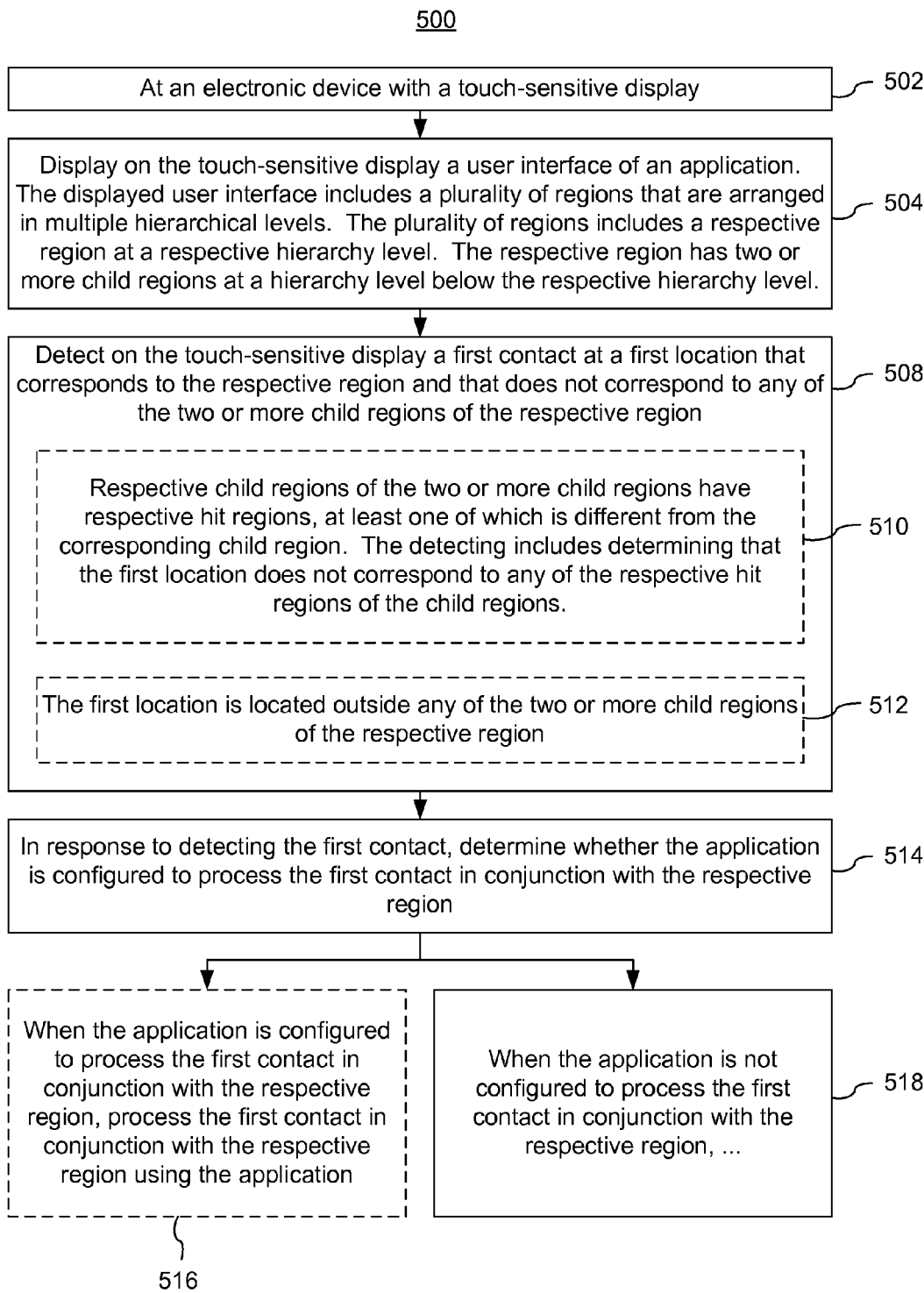
FIGS. 5A-5D are flow charts illustrating an exemplary method of processing a respective contact, in accordance with some embodiments.
Figure 5B:
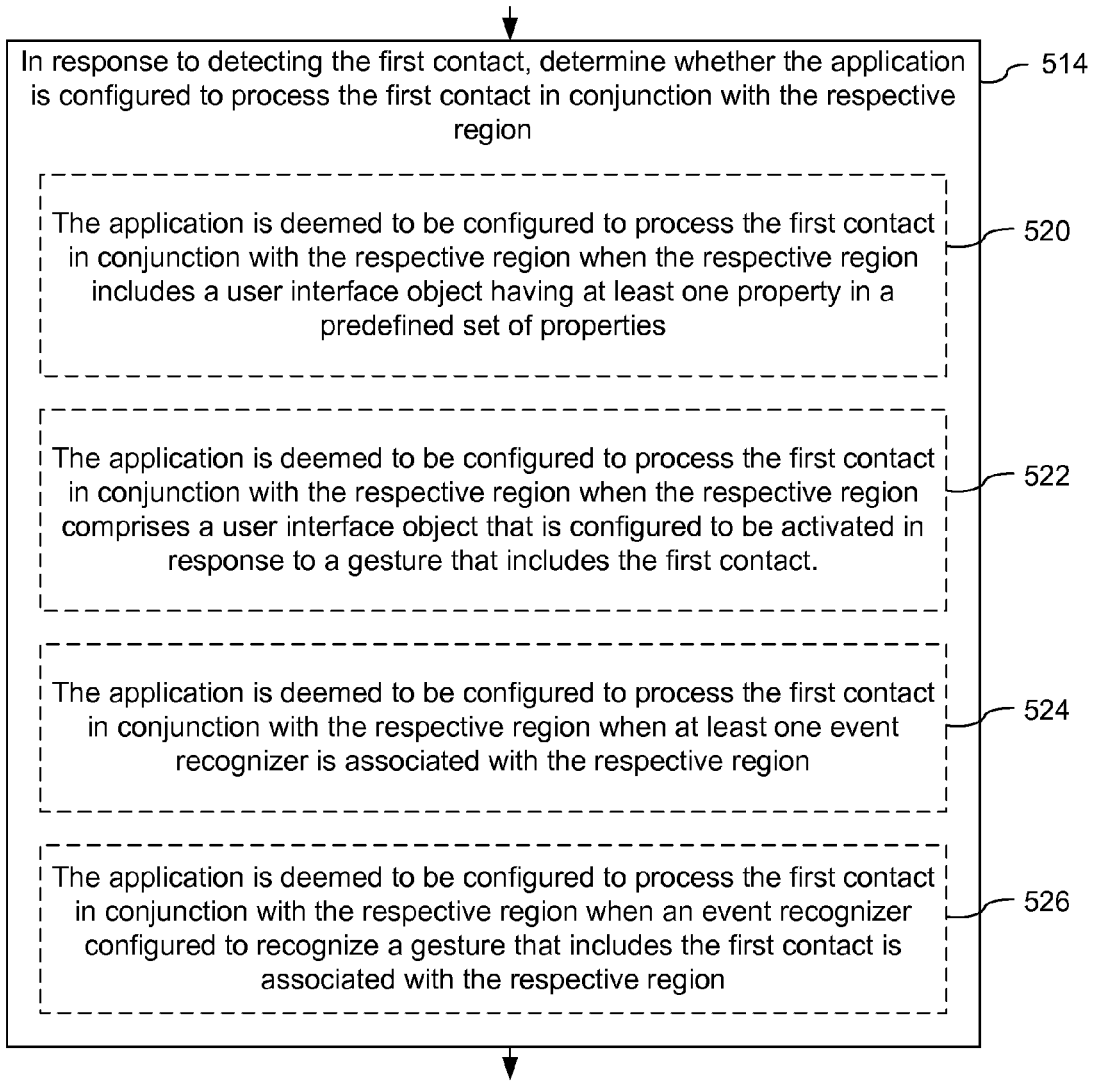
Figure 5C:
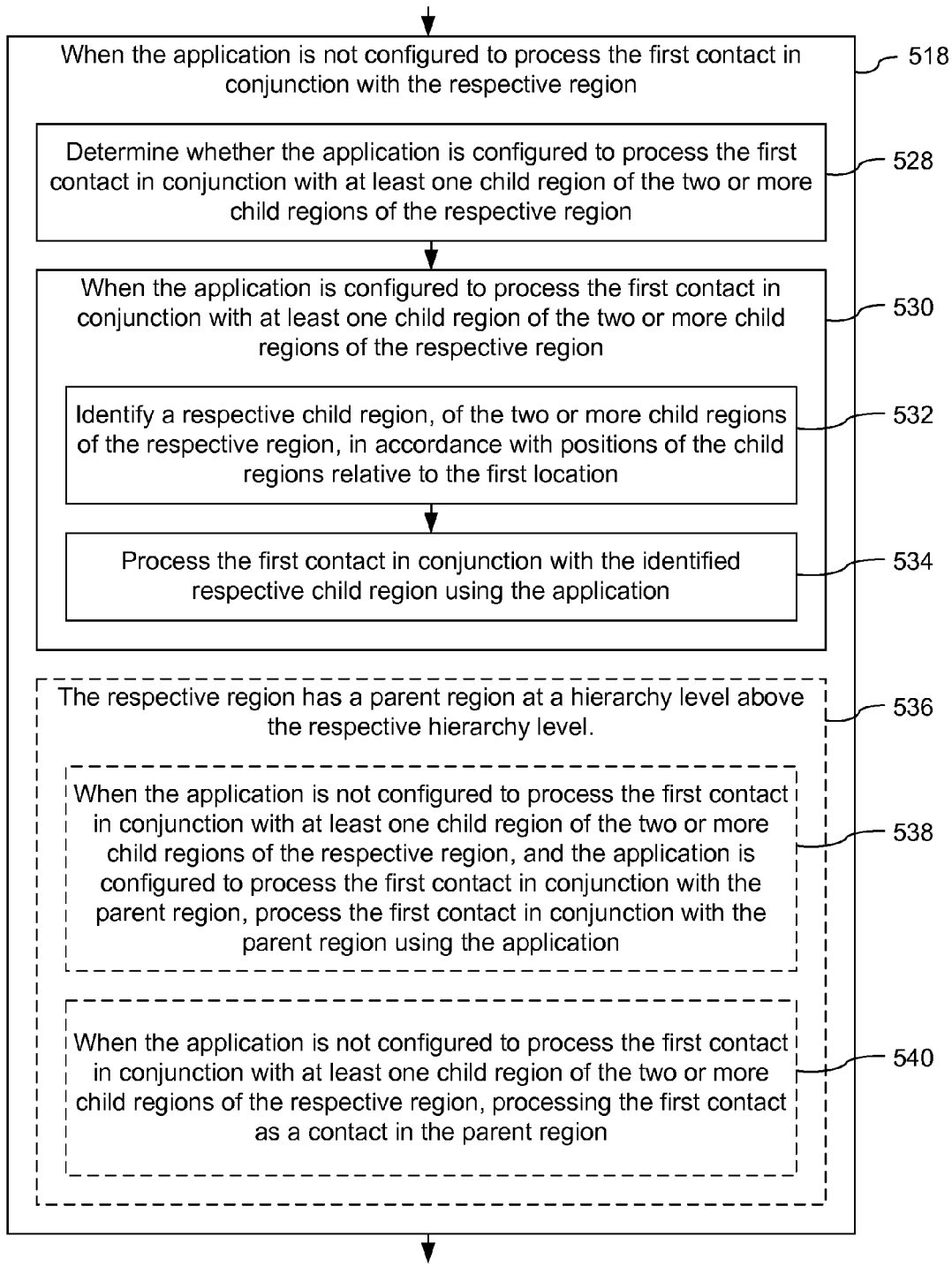
Figure 5D:
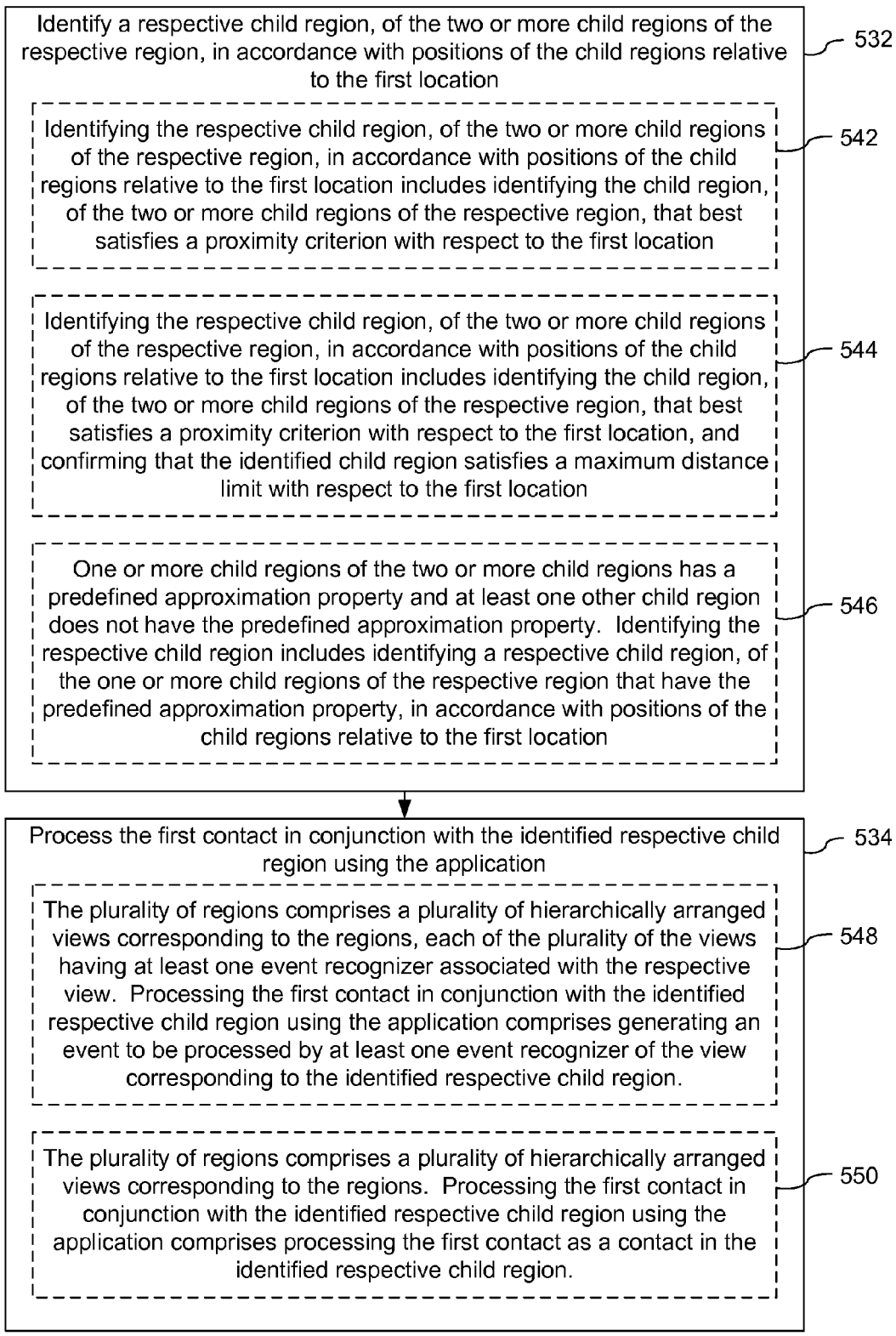

Electronic device 102 typically includes one or more single- or multi-core processing units ("CPU" or "CPUs") 110 as well as one or more network or other communications interfaces 112, respectively. Electronic device 102 includes memory 111 and one or more communication buses 115, respectively, for interconnecting these components. Communication buses 115 may include circuitry (sometimes called a chipset) that interconnects and controls communications between system components (not depicted herein). Memory 111 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 111 may optionally include one or more storage devices remotely located from the CPU(s) 110. Memory 111, or alternately the non-volatile memory device(s) within memory 111, comprise a computer readable storage medium. In some embodiments, memory 111, or the non-volatile memory device(s) within memory 111, comprises a non-transitory computer readable storage medium. In some embodiments, memory 111 or the computer readable storage medium of memory 111 stores the following programs, modules and data structures, or a subset thereof:

- operating system 118, which includes procedures for handling various basic system services and for performing hardware dependent tasks;
- accessibility module 126, which is used for modifying behavior of one or more software applications in application software 132 (including browser application 133) or modifying data from touch-sensitive display 156 or input device(s) 128 to improve accessibility of the one or more software applications in application software 132 or accessibility to content (e.g., a web page) displayed therein;
- communication module 120, which is used for connecting electronic device 102, respectively, to other devices via their one or more respective communication interfaces 112 (wired or wireless) and one or more communication networks, such as the Internet, other wide area networks, local area networks, metropolitan area networks, and so on;
- user interface module 122, which is used for displaying user interfaces including user interface objects on touch-sensitive display 156;
- control application 124, which is used for controlling processes (e.g., hit view determination, thread management, and/or event monitoring, etc.); in some embodiments, control application 124 includes a run-time application; in other embodiments, the run-time application includes control application 124;
- event delivery system 130, which may be implemented in various alternate embodiments within operating system 118 or in application software 132; in some embodiments, however, some aspects of event delivery system 130 may be implemented in operating system 118 while other aspects (e.g., at least a subset of event handlers) are implemented in application software 132;
- application software 132, which may include one or more software applications (e.g., an email application, web browser application 133, a text messaging application, etc.); a respective software application typically has, at least when executing, an application state, indicating the state of the software application and its components (e.g., gesture recognizers and delegates); see application internal state 792 (FIG. 7), described below;
- document 134 (e.g., a web page, or a user interface of a respective application 132 or embedded application 144), which may include content as well as a hierarchy of object/regions; in some embodiments, one or more objects/regions 136 in the hierarchy have one or more child objects/regions (e.g., 140-1 and 140-2); in some embodiments, at least a subset of object/region 136 and child objects/regions 140 has one or more properties 138, such as visibility (which indicates whether a corresponding object/region is shown or hidden when document 134 is rendered by application 132/133 and displayed on display 156), static characteristic (which indicates whether a corresponding object/region is configured to be changed by the user when document 134 is displayed), and predefined approximation property (which is described below with reference to operation 546 in FIG. 5D); in some embodiments, the hierarchy of objects/regions also includes a parent region/object and in some cases, additional regions/objects at a hierarchy level higher than the hierarchy level of object/region 136 and/or lower hierarchy region/object of any of child object/region 140; in some embodiments, document 134 also include embedded application 144, which may be based on Java script, Java applet, Ajax, Comet, Active X, or any other programming languages and tools; and
- device/global internal state 146, which includes one or more of: application state, indicating the state of software applications and their components (e.g., gesture recognizers); display state, indicating what applications, views or other information occupy various regions of touch-sensitive display 156; sensor state, including information obtained from the device's various sensors (not shown), input devices 128, and/or touch-sensitive display 156; and location information concerning the device's location and/or attitude.

Each of the above identified elements may be stored in one or more of the previously mentioned memory devices. Each of the above identified module, application or system elements corresponds to a set of instructions for performing functions described herein. The set of instructions can be executed by one or more processors (e.g., one or more CPUs 110). The above identified modules or programs (i.e., sets of instructions) need not be implemented as separate software programs, procedures or modules, and thus various subsets of these modules may be combined or otherwise rearranged in various embodiments. In some embodiments, memory 111 may store a subset of the modules and data structures identified above. Furthermore, memory 111 may store additional modules and data structures not described above.

Figure 2:
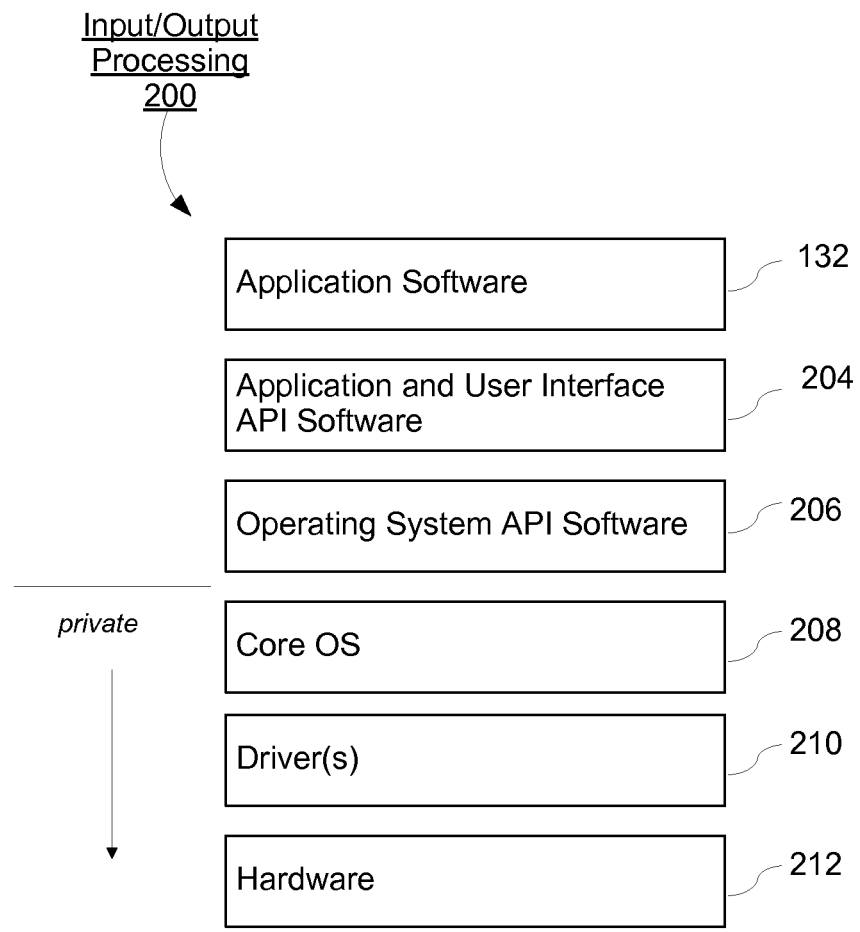
FIG. 2 is a diagram of an input/output processing stack of an exemplary electronic device, in accordance with some embodiments.

FIG. 2 is a diagram of input/output processing stack 200 of an exemplary electronic device or apparatus (e.g., device 102) according to some embodiments of the invention. Hardware (e.g., electronic circuitry) 212 of the device is at the base level of the input/output processing stack 200. Hardware 212 can include various hardware interface components, such as the components depicted in FIG. 1. Hardware 212 can also include one or more of above mentioned sensors 130. All the other elements (132, 204-210) of input/output processing stack 200 are software procedures, or portions of software procedures, that process inputs received from hardware 212 and generate various outputs that are presented through a hardware user interface (e.g., one or more of a display, speakers, device vibration actuator).

A driver or a set of drivers 210 communicates with hardware 212. Drivers 210 can receive and process input data received from hardware 212. Core Operating System ("OS") 208 can communicate with driver(s) 210. Core OS 208 can process raw input data received from driver(s) 210. In some embodiments, drivers 210 can be considered to be a part of core OS 208.

A set of OS application programming interfaces ("OS APIs") 206, are software procedures that communicate with core OS 208. In some embodiments, APIs 206 are included in the device's operating system, but at a level above core OS 208. APIs 206 are designed for use by applications running on the electronic devices or apparatuses discussed herein. User interface (UI) APIs 204 can utilize OS APIs 206. Application software ("applications") 132 running on the device can utilize UI APIs 204 in order to communicate with the user. UI APIs 204 can, in turn, communicate with lower level elements, ultimately communicating with various user interface hardware, e.g., multitouch display 156.

While each layer input/output processing stack 200 can utilize the layer underneath it, that is not always required. For example, in some embodiments, applications 132 can occasionally communicate with OS APIs 206. In general, layers at or above OS API layer 206 may not directly access Core OS 208, driver(s) 210, or hardware 212, as these layers are considered private. Applications in layer 132 and UI API 204 usually direct calls to the OS API 206, which in turn, accesses the layers Core OS 208, driver(s) 210, and hardware 212.

Stated in another way, one or more hardware elements 212 of electronic device 102, and software running on the device, such as, for example, drivers 210, core OS (operating system) 208, operating system API software 206, and Application and User Interface API software 204 detect input events (which may correspond to sub-events in a gesture) at one or more of the input device(s) 128 and/or a touch-sensitive display 156 and generate or update various data structures (stored in memory of device 102) used by a set of currently active event recognizers to determine whether and when the input events correspond to an event to be delivered to application 132. Embodiments of event recognition methodologies, apparatus and computer program products are described in more detail below.

Figure 3:
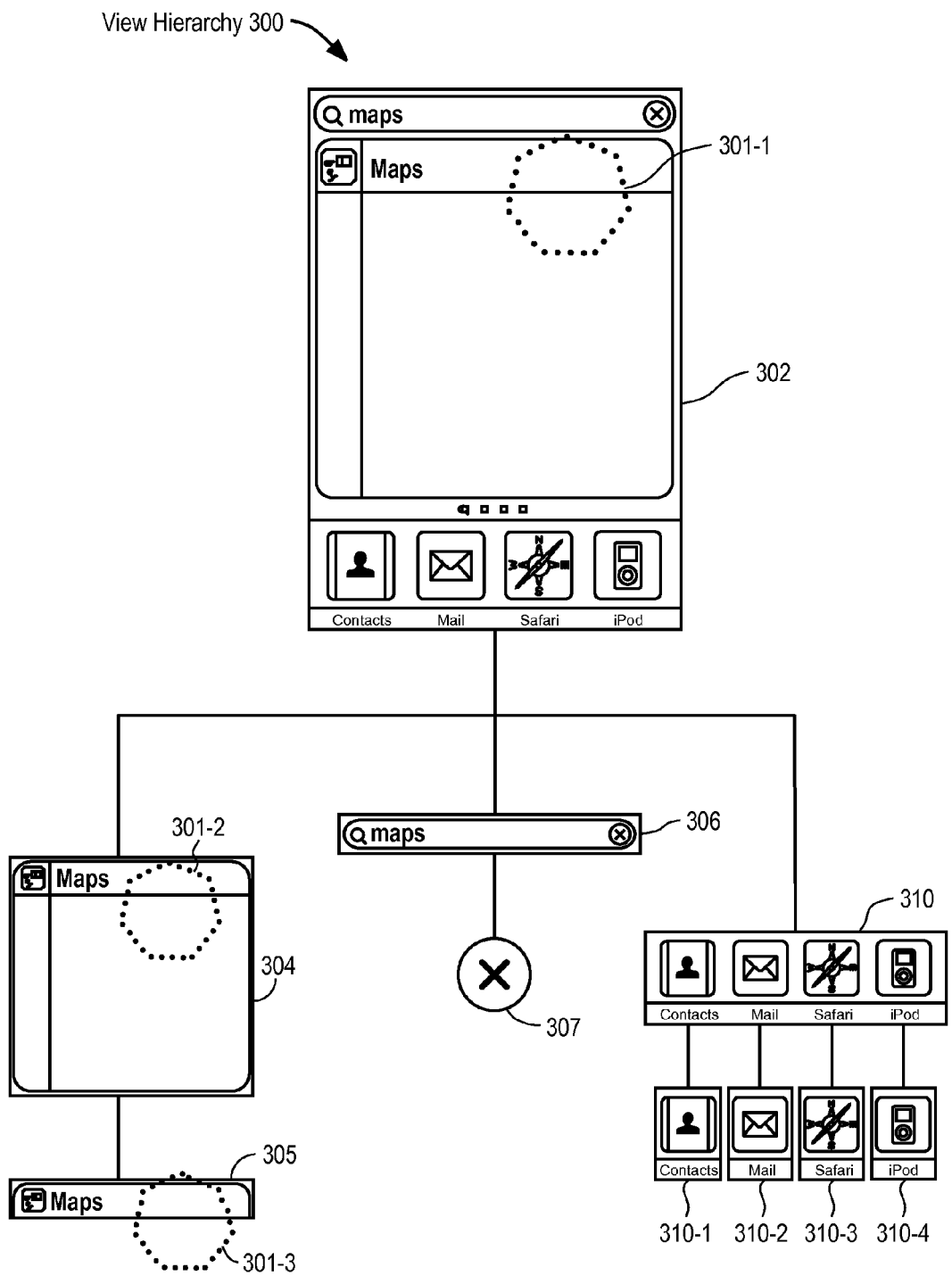
FIG. 3 illustrates an exemplary view hierarchy, in accordance with some embodiments.

FIG. 3 depicts an exemplary view hierarchy 300 (also called a hierarchy of regions), which in this example is a search program displayed in outermost view 302 (which is typically a highest view). As used herein, in some embodiments, a respective view corresponds to a respective region, and in some embodiments, a respective user interface object corresponds to a respective region. Outermost view 302 (or an outermost region) generally encompasses the entire user interface a user may directly interact with, and includes subordinate views (also called child regions), e.g., search results panel view 304, which groups search results and can be scrolled vertically;
search field view 306, which accepts text inputs; and
a home row view 310, which groups applications for quick access.

In this example, each subordinate view includes lower-level subordinate views (or a child region of the respective child region). In other examples, the number of view levels in the hierarchy 300 may differ in different branches of the hierarchy, with one or more subordinate views having lower-level subordinate views, and one or more other subordinate views may not have any such lower-level subordinate views. Continuing with the example shown in FIG. 3, search results panel view 304 contains a respective subordinate view 305 (subordinate to panel 304) for each search result. Here, this example shows one search result in a subordinate view called maps view 305. Search field view 306 includes a subordinate view herein called clear contents icon view 307, which clears the contents of a search field in the search field view 306 when a user performs a particular action (e.g., a single touch or tap gesture) on the clear contents icon in view 307. Home row view 310 includes subordinate views 310-1, 310-2, 310-3, and 310-4, which respectively correspond to a contacts application, an email application, a web browser, and an iPod music interface.

Stated differently, search result panel view 304 is a parent region of maps view 305, and outermost view 302 is a parent region of search result panel view 304. At the same time, search result panel view 304 is a child region of outermost view 302, and maps view 305 is a child region of search result panel view 304. Similarly, search field view 306 and home row view 310 are also child regions of outermost view 302.

In FIG. 3, a touch sub-event 301-1 is represented in outermost view 302. Given the location of touch sub-event 301-1 over both the search results panel 304, and maps view 305, the touch sub-event is also represented over those views as 301-2 and 301-3, respectively. Actively involved views of the touch sub-event include all views that correspond to the location of touch sub-event 301-1 (e.g., views search results panel 304, maps view 305, and outermost view 302). A hit view is the lowest level view among the actively involved views, which in this example is maps view 305. Additional information regarding sub-event delivery and actively involved views is provided below with reference to FIG. 7.

Views (and corresponding programmatic levels) can be nested. In other words, a view can include other views. Consequently, the software element(s) (e.g., event recognizers) associated with a first view can include or be linked to one or more software elements associated with views within the first view. While some views can be associated with applications, others can be associated with high level OS elements, such as graphical user interfaces, window managers, etc.

Figure 4A:
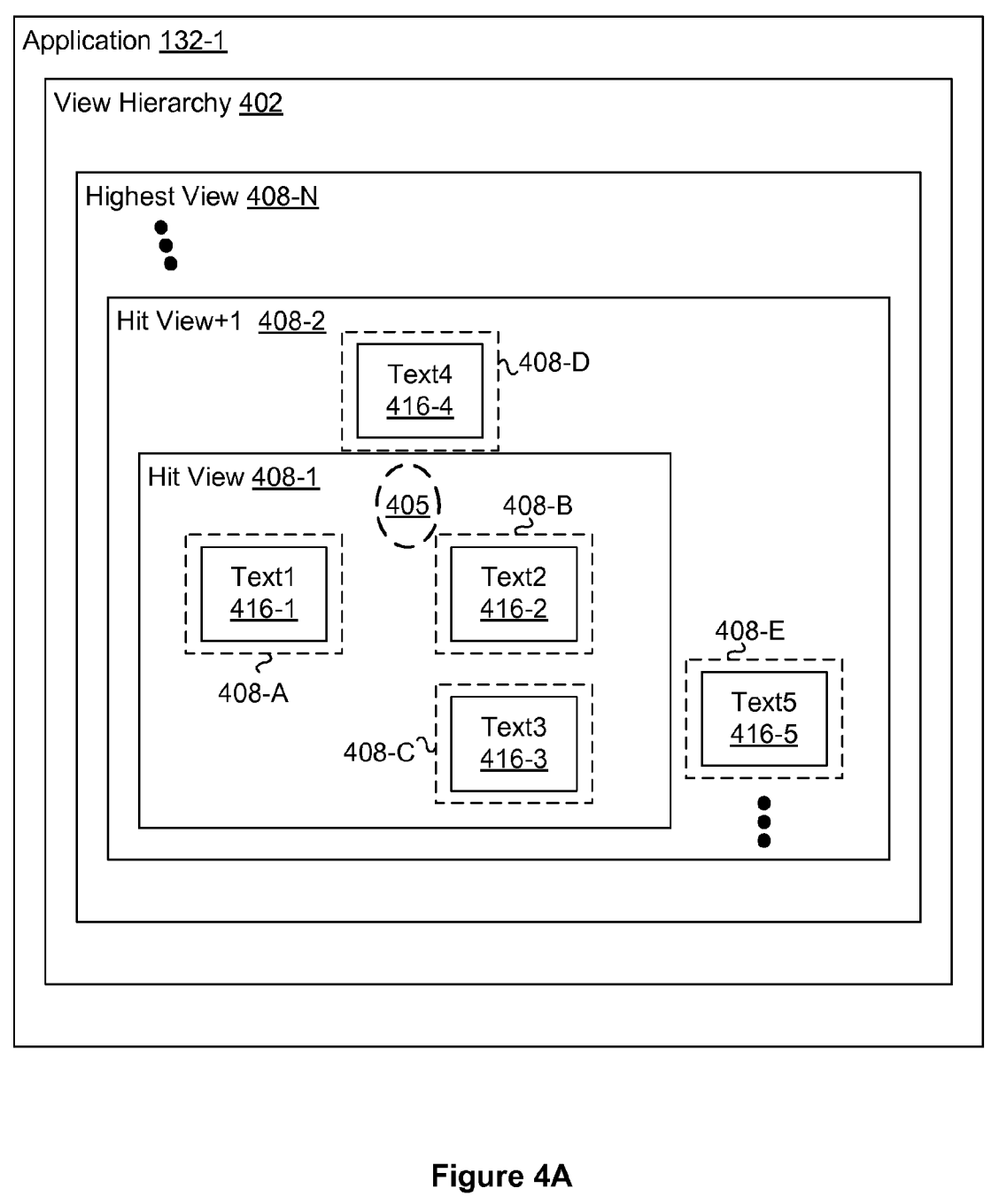
Figure 4B:
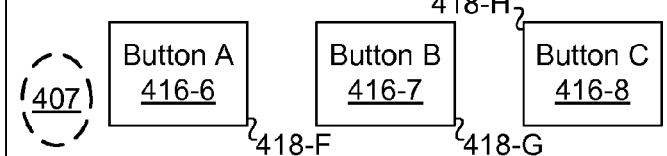
Figure 4B:
Figure 4C:
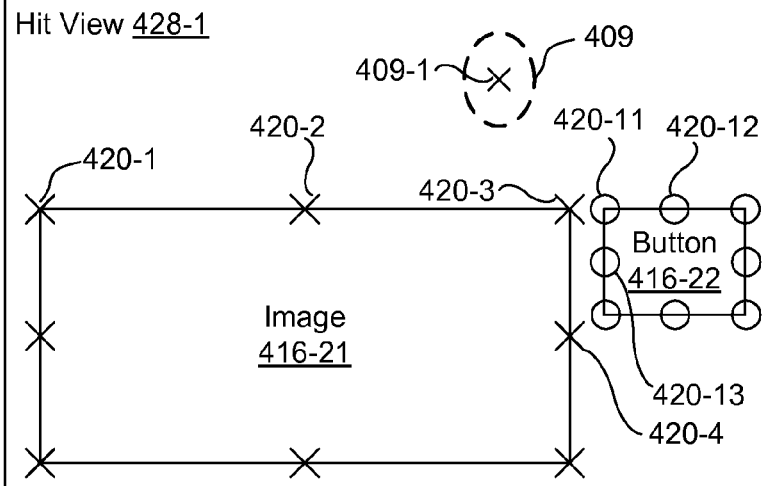

FIGS. 4A-4C are exemplary user interfaces including a hierarchy of views, in accordance with some embodiments.

In FIG. 4A, application 132-1 includes a plurality of views 408 (e.g., 408-1 and 408-2 through 408-N) in view hierarchy 402. In this example, Hit View 408-1 includes a plurality of child views 408-A, 408-B, and 408-C and a plurality of user interface objects (text1 416-1 through text3 416-3) in the child views (408-A through 408-C). Hit View+1 408-2 (also called a parent view of Hit View 408-1) includes a plurality of child views (408-1, 408-D and 408-E) and a plurality of user interface objects (text1 416-1, text2 416-2, text3 41603, text4 416-4 and text5 416-5) in the plurality of child views (408-1, 408-D and 408-E). Although a respective child view may match the size of a user interface object that is included in the respective child view, in this example each child view is larger than a respective user interface object it includes (e.g., child view 408-A is larger than text1 416-1). Such view or region can be used as a hit region for the respective user interface object it includes such that any function associated with the respective user interface object is activated when a contact is detected at a location corresponding to the hit region, even if the contact is detected outside the respective user interface object. In some embodiments, respective child views in a subset of child views are larger than corresponding respective user interface objects, while remaining child views match the size of corresponding respective user interface objects.

FIG. 4A also illustrates that contact 405 is detected on the touch-sensitive display. A lowest view in view hierarchy 402 that corresponds to a contact is called a hit view. In this example, Hit View 408-1 is a lowest view in view hierarchy 402 that corresponds to contact 405. In this example, at the location of contact 405, Hit View 408-1 does not include any user interface object.

When application 132-1 is configured to process contact 405 in conjunction with Hit View 408-1, contact 405 is processed in conjunction with Hit View 408-1 using application 132-1. When application 132-1 is not configured to process contact 405 in conjunction with Hit View 408-1 (e.g., Hit View 408-1 does not have any gesture recognizers; or, there is no gesture recognizer attached to Hit View 408-1 that is configured to recognize or try to recognize contact 405), other views are evaluated to determine whether application 132-1 can process contact 405 in conjunction with any other view 408. For example, child views 408-A through 408-C of Hit View 408-1 are first evaluated. In this example, Hit View 408-1 does not have any gesture recognizer that is configured to recognize or try to recognize contact 405 because the location of the contact 405 does not overlap the hit region of any user interface object in Hit View 408-1.

When application 132-1 is configured to process contact 405 in conjunction with one of child views 408-A through 408-C (e.g., when only child view 408-C of child views 408-A through 408-C has a gesture recognizer that is configured to recognize or try to recognize contact 405), contact 405 is processed in conjunction with that child view using the application. When application 132-1 is configured to process contact 405 in conjunction with two or more of the child views 408-A through 408-C (e.g., when each of the child views 408-A through 408-C has a gesture recognizer that is configured to recognize or try to recognize contact 405), one of the two or more child views is selected to process contact 405. Typically, a child view that is closest to contact 405 is selected (e.g., view 408-B including text2 416-2).

When application 132-1 is not configured to process contact 405 in conjunction with any of the child views 408-A through 408-C of Hit View 408-1, a parent view (e.g., 408-2) of Hit View 408-1 is evaluated. When application 132-1 is configured to process contact 405 in conjunction with parent view 408-2 (also called HitView+1), contact 405 is processed in conjunction with parent view 408-2 using application 132-1. If the application is not configured to process contact 405 in conjunction with parent view 408-2, other child views of parent view 408-2 (i.e., child views of parent view 408-2 other than Hit View 408-1, such as child view 408-D and 408-E) are evaluated. Hit View 408-1 is excluded from the child views of parent view 408-2 because that view (Hit View 408-1) was already evaluated with respect to contact 405 prior to contact 405 being evaluated with respect to Hit View 408-2.

Similar to processing contact 405 using one or more child views of Hit View 408-1, when application 132-1 is configured to process contact 405 with one of child views 408-D through 408-E, contact 405 is processed in conjunction with the one child view using the application. When application 132-1 is configured to process contact 405 in conjunction with two or more of the child views (e.g., both 408-D and 408-E), one of the two or more child views is selected to process contact 405. Typically, a child view that is closest to contact 405 is selected (e.g., view 408-D including text4 416-4). Typically, once a respective view is selected for processing a contact, the contact is bound to that view (meaning that all event processing for the contact and any subsequent portions of a gesture or event) until the event associated with the contact is completed.

When application 132-1 is not configured to process contact 405 in conjunction with any of the child views 408-D and 408-E of parent view 408-2, child views (not shown) of the child views 408-D and 408-E are evaluated, followed by evaluation of a parent view (e.g., grandparent view) of the parent view, and then child views of the grandparent view. Such evaluations are repeated through the view hierarchy 402 until all lower views of highest view 408-N are evaluated.

In some embodiments, when application 132-1 is not configured to process contact 405 in conjunction with any view in view hierarchy 402, contact 405 is ignored. In other embodiments, a predefined action (e.g., a default action, such as a selection of a default user interface object) is performed.

Although not shown in FIG. 4A, in some embodiments, Hit View 408-1 includes a single child view that includes a single user interface object (e.g., a button). When application 132-1 is not configured to process a contact on Hit View 408-1 in conjunction with Hit View 408-1 but is configured to process the contact in conjunction with the single child view of Hit View 408-1, the contact is processed in conjunction with the single child view using application 132-1.

Similar to FIG. 4A, FIG. 4B illustrates that application 132-2 includes a plurality of views 418 (e.g., 418-1A, 418-1B and 418-2 through 418-N) in view hierarchy 412 displayed on a touch-sensitive display. In this example, parent view 418-2 (HitView+1) includes two toolbars (418-1A and 418-1B). Hit View 418-1A that corresponds to contact 407 includes a first toolbar (toolbar1), and includes a plurality of buttons or icons on the toolbar (416-6 through 416-8) in a plurality of views (418-F through 418-H). In this example, a respective child view matches the size and shape of a respective user interface object included in it. View 418-1B includes a second toolbar (toolbar2) and a plurality of buttons (416-10 through 416-12) in a plurality of views (418-I through 418-K).

FIG. 4B also illustrates that contact 407 is detected on the touch-sensitive display. When application 132-2 is not configured to process contact 407 in conjunction with Hit View 418-1A but is configured to process contact 407 in conjunction with two or more of child views 418-F through 418-H, one of the two or more child views is selected. Typically, one of the two or more child views that is closest to contact 407 is selected.

When application 132-2 is not configured to process contact 407 in conjunction with any of child views 418-F through 418-H, parent view 418-2, and subsequently view 418-1B are evaluated, followed by evaluation of child views 408-I through 418-K of view 418-1B. If application 132-2 is configured to process contact 407 in conjunction of any of child views 418-I through 418-K, contact 407 may activate a function of application 132-2 that corresponds to one of the buttons on toolbar2 (e.g., button D 416-10, button E 416-11, or button F 416-12), even though contact 407 was detected on toolbar1.

Similar to FIG. 4A, FIG. 4C illustrates that application 132-3 includes a plurality of views 428 (e.g., 428-1 and 428-2 through 428-N) in view hierarchy 422 displayed on a touch-sensitive display. In this example, Hit View 428-1 includes two user interface objects of a different size (e.g., image 416-21 and button 416-22).

When a respective view includes user interface objects of different sizes and/or shapes (or child views of different sizes and/or shapes), there are multiple ways to identify a user interface object that is closest to a contact. In some embodiments, a centroid-to-centroid distance, which is a distance from a centroid (e.g., 409-1) of a contact (e.g., 409) to a centroid of a user interface object, is used to determine a closest user interface object. In some embodiments, a shortest distance, which is a distance from a first point on a user interface object that is closest to the centroid (e.g., 409-1) of the contact (e.g., 409) is used. In some embodiments, a predefined number of points (e.g., eight points) are used to simplify distance calculation. For example, eight points (top-left corner, top-right corner, bottom-left corner, bottom-right corner, middle of the top edge, middle of the bottom edge, middle of the left edge, and middle of the right edge) can be used to calculate eight distances per candidate user interface object, and a shortest distance of the eight distances is selected for each candidate user interface object. In some embodiments, a distance from a contact to a user interface object comprises a weighted average of distances from the contact to a predetermined number (e.g., three) of closest points of a respective child view or user interface object. For example, the three closest points of a respective child view or object may be selected from among nine predefined points, including the eight points mentioned above and the centroid of the object (or other "center" point in the objects interior). In some embodiments, different weights are used for each of the predetermined number of closest points. For example, when the predetermined number of closest points is three, the weights can be 0.5 for the closest point, 0.3 for the second closest point, and 0.2 for the third closest point (weighted distance=$0.5d_1+0.3d_2+0.2d_3$, where $d_1$, $d_2$ and $d_3$ are the distances from the first point to the closest, second closest and third closest points).

With respect to FIG. 4C, although the foregoing has been described for identifying a closest user interface object, analogous methods can be used to identify a closest view or region.

In some embodiments, at least one view in view hierarchy 402 includes a portion of a web page or other document. In some embodiments, views in view hierarchy 402 include different portions of a web page or other document.

FIGS. 5A-5D are flow charts illustrating an exemplary method of processing a respective contact, in accordance with some embodiments.

Method 500 is performed (502) at an electronic device (e.g., 102) with a touch-sensitive display (e.g., 156).

The device displays (504) on the touch-sensitive display a user interface of an application, the displayed user interface including a plurality of regions (e.g., views 408 in FIG. 4A) that are arranged in multiple hierarchical levels (e.g., view hierarchy 402). The plurality of regions includes a respective region (e.g., Hit View 408-1) at a respective hierarchy level. The respective region has two or more child regions at a hierarchy level below the respective hierarchy level (e.g., views 408-A, 408-B, and 408-C).

The device detects (508) on the touch-sensitive display a first contact (e.g., 405) at a first location that corresponds to the respective region and that does not correspond to any of the two or more child regions of the respective region. In FIG. 4A, Hit View 408-1 is the lowest level hit view, as there are no lower level views that "hit" or overlap with contact 405. The first location is typically the centroid of the first contact region, but may alternatively be determined from the first contact region in accordance with any appropriate methodology for assigning a specific location to a contact.

In some embodiments, respective child regions of the two or more child regions have (510) respective hit regions, at least one of which is different from the corresponding child region (e.g., text1 416-1 is a child region of view 408-1, and view 408-A is the hit region of text1 416-1, FIG. 4A). Detecting that the first contact (508) corresponds to the respective region includes determining that the first location does not correspond to any of the hit regions of the respective region's child regions. In some user interfaces, a respective hit region includes, and is larger than, a corresponding child region (e.g., view 408-A includes, and is larger than, text1 416-1). A user interface object or region can have a hit region of a different size (e.g., larger, smaller, and/or skewed) from the user interface object or region to facilitate selection of particular objects or regions of the user interface. On the other hand, the hit region of a respective user interface object or region can be coextensive with (have the same size, shape and position as) the user interface object or region.

Typically, in order for the first contact to correspond to the respective region, the first location is located (512) outside any of child regions of the respective region (e.g., contact 405 is located outside any of child views 408-A through 408-C, FIG. 4A).

In response to detecting the first contact, the device determines (514) whether the application is configured to process the first contact in conjunction with the respective region (e.g., the device determines whether Hit View 408-1 includes a gesture recognizer that is configured to recognize or try to recognize contact 405).

In some embodiments, the application is deemed (520, FIG. 5B) to be configured to process the first contact in conjunction with the respective region when the respective region includes a user interface object having at least one property in a predefined set of properties. For example, application 132-1 in FIG. 4A is deemed to be configured to process the first contact (e.g., 405) in conjunction with view 408-A when a user interface object (e.g., text1 416-1) in that view 408-A has a predefined "approximation" property (which enables object selection or activation even when a user contact does not overlap the object). In some embodiments, the application 132-1 is deemed to be configured to process the first contact in conjunction with the respective region when the respective region itself has at least one property in a predefined set of properties. For example, application 132-3 in FIG. 4C would be deemed to be configured to process the first contact (e.g., 409) in conjunction with view 428-1, if view 428-1 were to have a text property specifying text to be spoken when the view 428-1 is selected and an accessibility option for speaking such text is enabled.

In some embodiments, a respective region is deemed to be configured to process the first contact, when the respective region is the region for a user interface object of a type in a predefined set of user interface object types (e.g., button, checkbox, combobox, link, list box, menu button, pop-up button, radio button, slider, and text field). In some embodiments, the predefined set of user interface object types also includes one or more of: disclosure triangle, heading, image, static text, and text area.

In some embodiments, the application is deemed (522) to be configured to process the first contact in conjunction with the respective region when the respective region includes a user interface object that is configured to be activated in response to a gesture that includes the first contact (at the location of that first contact). For example, application 132-1 in FIG. 4A is deemed to be configured to process the first contact (e.g., 405) in conjunction with view 408-A, when view 408-A includes a user interface object (e.g., text1 416-1) that is configured to be activated in response to a gesture that includes the first contact. Non-limiting examples of a user interface object that is not configured to be activated in response to a gesture that includes the first contact include: 1) a static user interface object (e.g., a label for displaying text or graphics, without any assigned function), and 2) a user interface object that is configured to be activated in response to a different gesture (e.g., a two-finger contact). An example of a user interface region that is not configured to be activated in response to a gesture that includes the first contact is: Hit View 408-1 because the first contact 405 does not overlap any selectable/activatable object in Hit View 408-1. Furthermore, the application is deemed to be configured to process the first contact in conjunction with the respective region when the respective region itself has a user interface object that is configured to be activated in response to a gesture that includes the first contact.

In some embodiments, the application is deemed (524) to be configured to process the first contact in conjunction with the respective region when at least one event recognizer is associated with the respective region. Event recognizers (or gesture recognizers) are described in detail with respect to FIG. 7. More typical are embodiments in which an application is deemed (526) to be configured to process the first contact in conjunction with the respective region when an event recognizer configured to recognize a gesture that includes the first contact is associated with the respective region. Conversely, when a particular type of contact (e.g., a one-finger contact) is detected, and a respective region (or a view) does not include an event recognizer that is configured to recognize a gesture beginning with that type of contact, the respective region is not deemed to be configured to process the first contact in conjunction with the respective region.

When the application is configured to process the first contact in conjunction with the respective region, the device processes (516, FIG. 5A) the first contact in conjunction with the respective region using the application. For example, the device activates a function associated with the respective region (e.g., if the respective region includes a save button, the device initiates saving of a corresponding content or document). In another example, if the respective region includes a hyperlink (e.g., a uniform resource locator), the device initiates opening a resource (e.g., a web page) corresponding to the hyperlink.

In some embodiments, processing the first contact in conjunction with the respective region using the application includes presenting confirmation information. In some embodiments, presenting conformation information includes providing affordance. For example, the device may visually distinguish (e.g., bolding, flashing, enlarging, and/or changing colors) text corresponding to the respective region (e.g., text included in the respective region, a name of a function corresponding to the respective region, or embedded text corresponding to the respective region, such as help text). Presenting confirmation information can include non-visual signals. For example, the device may use a text-to-speech software to convert the text corresponding to the respective region into an audible speech signal, or may play a sound clip corresponding to the respective region. In another example, the device may convert the text corresponding to the respective region into Braille symbols for presentation using a Braille device (not shown).

In some embodiments, processing the first contact in conjunction with the respective region using the application includes receiving a confirmation gesture. For example, after presenting the confirmation information, the device receives a confirmation gesture (e.g., a single tap gesture, a double tap gesture, or a tap-and-hold gesture, located anywhere on the touch-sensitive display of the device or within a specific region on the touch-sensitive display, such as bottom half of the touch-sensitive display).

When the application is not configured to process the first contact in conjunction with the respective region (518 in FIGS. 5A and 5C), the device performs at least a subset of the following operations (e.g., operations 528, 530, 532, 534, and operations included therein, and in some embodiments, operations 536, 538, and/or 540).

The device determines (528 in FIG. 5C) whether the application is configured to process the first contact in conjunction with at least one child region of the two or more child regions of the respective region (e.g., in FIG. 4A, the device determines whether application 132-1 is configured to process contact 405 in conjunction with any of views 408-A, 408-B, and 408-C).

When the application is configured to process the first contact in conjunction with at least one child region of the two or more child regions of the respective region (530), the device performs the following operations (e.g., operations 532 and 534, and operations included therein).

The device identifies (532) a respective child region, of the two or more child regions of the respective region, in accordance with positions of the child regions relative to the first location. For example, the device identifies child view 408-B of child views 408-A through 408-C as a closest child view, in accordance with positions of child views 408-A through 408-C relative to contact 405.

In some embodiments, identifying the respective child region (operation 532), of the two or more child regions of the respective region, in accordance with positions of the child regions relative to the first location includes (542, FIG. 5D) identifying the child region, of the two or more child regions of the respective region, that best satisfies a proximity criterion with respect to the first location. For example, the device identifies a child region that is closest to the first location based on the proximity criterion. The proximity criterion is based on at least one of: the centroid-to-centroid distance, the shortest distance between a user interface object or a child view to the first location, a shortest distance to the first location based on a predetermined number of points (for each child view), and a shortest distance to the first location based on a weighted average of distances from a predetermined number of points (for each child view).

In some embodiments, identifying the respective child region (operation 532), of the two or more child regions of the respective region, in accordance with positions of the child regions relative to the first location includes (544) identifying the child region, of the two or more child regions of the respective region, that best satisfies a proximity criterion with respect to the first location, and confirming that the identified child region satisfies a maximum distance limit with respect to the first location. For example, if the distance from the identified child view to the first location exceeds the maximum distance limit, the identified child region is ignored. In some embodiments, when none of the child regions are within maximum distance limit of the contact of the first location, the device ignores the contact at the first location. In other embodiments, the device continues to evaluate other regions, including a parent region of the respective region.

In some user interfaces, one or more child regions of the two or more child regions has (546) a predefined approximation property and at least one other child region does not have the predefined approximation property. Identifying the respective child region includes identifying a respective child region, of the one or more child regions of the respective region that have the predefined approximation property, in accordance with positions of the child regions relative to the first location. For example, at least a subset of the child regions can be configured to have a predefined approximation property. The predefined approximation property indicates whether a corresponding region is eligible for activation/selection even when a contact is detected at a location that does not correspond to the region. The predefined approximation property can be located within properties (e.g., 138 in FIG. 1) in each of the subset of the child regions. When the predefined approximation property is used, the device identifies a child region among child regions that have the predefined approximation property.

When an appropriate region of the user interface (e.g., the identified child region) has been identified, the device processes (534, FIGS. 5C and 5D) the first contact in conjunction with that region (e.g., the identified respective child region) using the application.

In some embodiments, the plurality of regions comprises (548) a plurality of hierarchically arranged views corresponding to the regions. Each of the plurality of the views typically has at least one event recognizer associated with the respective view. Processing the first contact in conjunction with the identified respective child region using the application comprises generating an event (or sub-event, when the contact corresponds to the first portion of a gesture or event) to be processed by at least one event recognizer of the view corresponding to the identified respective child region.

In some embodiments, the plurality of regions comprises (550) a plurality of hierarchically arranged views corresponding to the regions. Processing the first contact in conjunction with the identified respective child region using the application comprises processing the first contact as a contact in the identified respective child region. In some embodiments, processing the first contact as a contact in the identified respective child region includes generating a new event (or sub-event, as explained above) at a location that corresponds to the identified respective child region. For example, in FIG. 4A, when the device processes contact 405 as a contact in child view 408-B, the device generates a new event that indicates a virtual contact at a location that corresponds to child view 408-B.

In some user interfaces, the respective region has (536, FIG. 5C) a parent region (e.g., Hit View+1 408-2) at a hierarchy level above the respective hierarchy level. Optionally, in this situation, when the application is not configured to process the first contact in conjunction with at least one child region of the two or more child regions of the respective region, and the application is configured to process the first contact in conjunction with the parent region, the device processes (538) the first contact in conjunction with the parent region using the application. For example, in FIG. 4A, if application 132-1 is not configured to process contact 405 in conjunction with any of child views 408-A through 408-C, the device processes contact 405 in conjunction with Hit View+1 408-2, if the application 132-1 is configured to process contact 405 in conjunction with Hit View+1 408-2.

In some embodiments, when the application is not configured to process the first contact in conjunction with at least one child region of the two or more child regions of the respective region, the device processes (540) the first contact as a contact in the parent region. In some embodiments, processing the first contact as a contact in the parent region includes generating a new event (or sub-event, as explained above) at a location that corresponds to the parent region. For example, in FIG. 4A, when the device processes contact 405 as a contact in Hit View+1 408-2, the device generates a new event that indicates a virtual contact at a location that correspond to Hit View+1 408-2.

In some user interfaces, the parent region has one or more child regions at a hierarchy level at the respective hierarchy level, and when the application is not configured to process the first contact in conjunction with the parent region, the device processes the first contact in conjunction with at least one of the one or more child regions of the parent region, based on a condition that the application is configured to process the first contact in conjunction with at least one of the one or more child regions of the parent region.

Note that details of the processes described above with respect to method 500 are also applicable in an analogous manner to method 600 described below. For brevity, these details are not repeated below.

Figure 6:
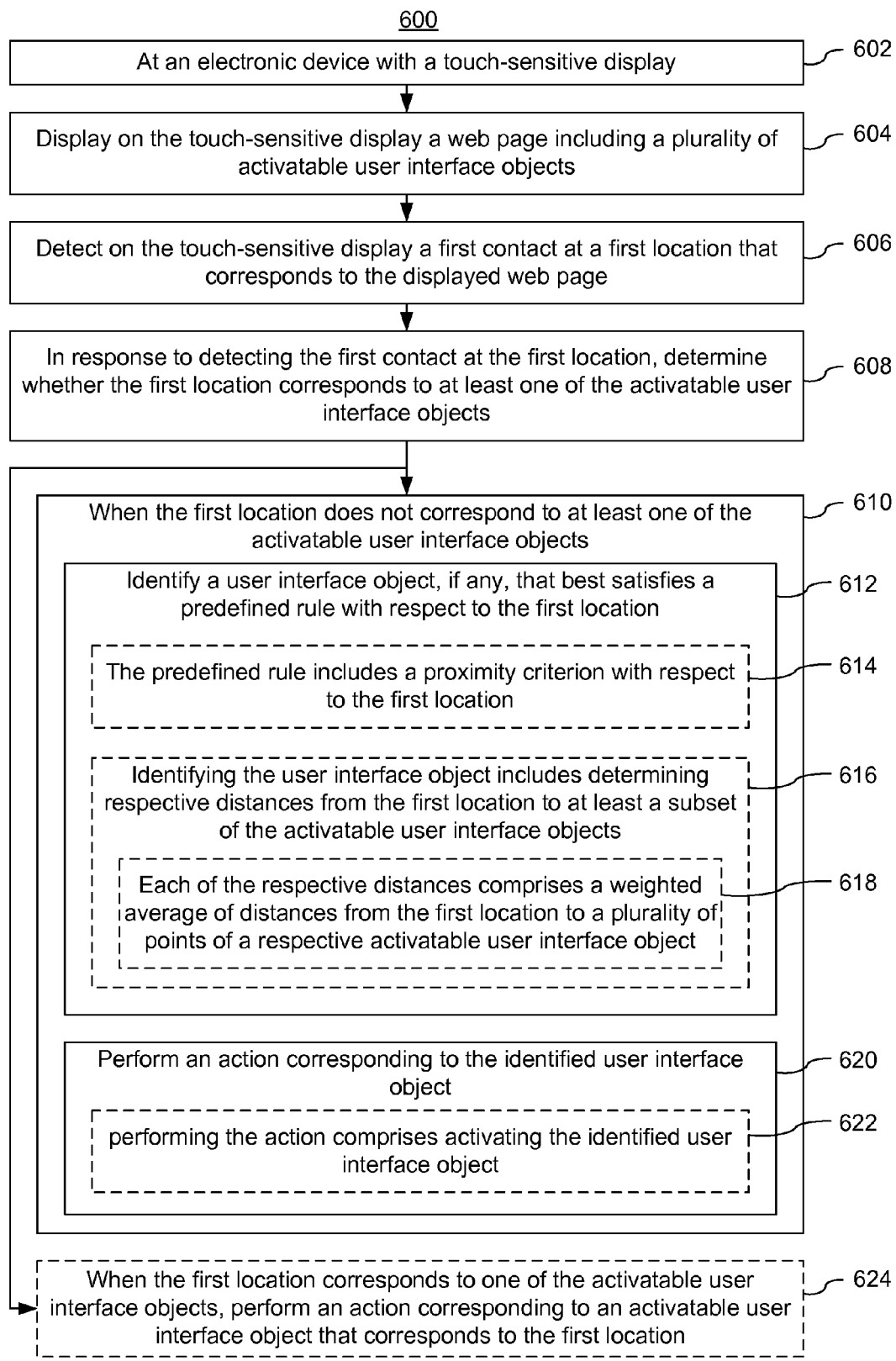
FIG. 6 is a flow chart illustrating an exemplary method of processing a respective contact on a web page or other document, in accordance with some embodiments.

FIG. 6 is a flow chart illustrating an exemplary method of processing a respective contact on a web page or other document, in accordance with some embodiments.

Method 600 is performed (602) at an electronic device (e.g., 102) with a touch-sensitive display (e.g., 156).

The device displays (604) on the touch-sensitive display a web page or other document 134 (FIG. 1) including a plurality of activatable user interface objects (e.g., in FIG. 4C, one or more views in view hierarchy 422 include a web page or other document in some embodiments, and the views also include user interface objects 416-21 and 416-22). In some embodiments, all user interface objects are activatable. In some embodiments, user interface objects with certain user interface object properties (e.g., hidden or static user interface objects) are not activatable while other user interface objects are activatable. In some embodiments, user interface objects of certain types (e.g., labels) are not activatable. Optionally, some or all of the objects in the displayed document may be generated by an embedded application, embedded in the document, as opposed to being statically defined by HTML or XML instructions (e.g., tags or elements) in the document. On the other hand, some or all of the objects in the displayed document may defined by HTML or XML instructions in the document.

The device detects (606) on the touch-sensitive display a first contact at a first location that corresponds to the displayed web page (e.g., contact 409).

In response to detecting the first contact at the first location, the device determines (608) whether the first location corresponds to at least one of the activatable user interface objects (e.g., in FIG. 4C, contact 409 does not correspond to any of the user interface objects).

In some embodiments, when the first location corresponds to one of the activatable user interface objects, the device performs (624) an action corresponding to an activatable user interface object that corresponds to the first location (e.g., the hit region of the object overlaps the first location).

When the first location does not correspond to at least one of the activatable user interface objects (610), the device performs the following operations (e.g., 612 and 620 and in some embodiments, operations included therein).

The device identifies (612) a user interface object, if any, that best satisfies a predefined rule with respect to the first location. In some embodiments, the predefined rule requires identifying a closest activatable user interface object, and the device identifies a closest user interface object. In some embodiments, the predefined rule requires identifying a closest activatable user interface object within a maximum distance limit, and the device identifies a closest activatable user interface object, if there is one. However, the device may not identify any activatable user interface object if none of the activatable user interface objects are within the maximum distance limit.

In some embodiments, the predefined rule includes (614) a proximity criterion with respect to the first location. As discussed above, the proximity criterion is based on at least one of: the object centroid-to-first location distance; the shortest distance from a user interface object to the first location; the shortest distance from a user interface object to the first location based on a predetermined number of points for each activatable user interface object (e.g., the closest point of eight candidate points: four corners, four edge midpoints of the object); and the shortest weighted average distance from a user interface object to the first location, where the weighted average distance to the first location from a user interface object is based on a predetermined number (e.g., 3) of points of nine candidate points: four corners, four edge midpoints, and the centroid of the user interface object.

In some embodiments, detecting the first contact includes determining a speed and direction of the first contact at the first location, and the predefined rule is based on a weighted combination of a plurality of factors including the proximity criterion with respect to the first location, and a direction and speed of movement of the first contact. For example, in FIG. 4C, although image 416-21 is a closest activatable user interface object to contact 409, the device may identify button 416-22 as a user interface object that best satisfies a predefined rule when contact 409 is moving toward button 416-22 at a sufficient speed. Similarly, when contact 409 is moving away from a particular button, the direction of movement of the contact away from the button is taken into account when applying the predefined rule (operation 612), which reduces the likelihood of identifying that button as the object that best satisfies the predefined rule.

In some embodiments, identifying the user interface object includes (616) determining respective distances from the first location to at least a subset of the activatable user interface objects (e.g., in FIG. 4C, the device determines respective distances from contact 409 to image 416-21 and button 416-22) in order to identify a user interface object that best satisfies the predefined rule.

In some embodiments, each of the respective distances comprises (618) a weighted average of distances from the first location to a plurality of points of a respective activatable user interface object. For example, a distance between contact 409 and image 416-21 can be a weighted average of distances from the first location to a predetermined number (e.g., three) of points of image 416-21 (e.g., a weighted average of: a distance from contact centroid 409-1 to point 420-3, a distance from contact centroid 409-1 to point 420-2, and a distance from contact centroid 409-1 to point 420-4). In some embodiments, a shortest distance is more heavily weighted than a next shortest distance (e.g., the distance from contact centroid 409-1 to point 420-3 is more heavily weighted than the distance from contact centroid 409-1 to point 420-2).

The device performs (620) an action corresponding to the identified user interface object. The action performed typically depends on one or more characteristics of the identified user interface object. For example, when the identified user interface object is image 416-21 in FIG. 4C, the device performs an action corresponding to image 416-21 (e.g., it changes the image displayed in 416-21, or directs the device to display a web page associated with image 416-21, etc.).

In some embodiments, performing the action comprises (622) activating the identified user interface object.

In some embodiments, the device determines on the touch-sensitive display a respective location of a respective activatable user interface object in the plurality of activatable user interface objects. For example, when rendering a web page, the device determines respective locations of respective activatable user interface objects (e.g., hyperlinks in the web page), and uses the respective locations in determining whether a contact overlaps with one of the user interface objects (e.g., operation 608) and/or identifying a user interface object that best satisfies a predefined rule (e.g., operation 612).

The operations described above with reference to FIGS. 5A-5D and 6 may be implemented in accessibility module 126 (in FIG. 1), application software 132 (in particular, browser application 133), and/or embedded application 144. In addition to, or instead of, accessibility module 126, application software 132, and/or embedded application 144, the operations described above may be implemented by components depicted in FIG. 7.

Figure 7:
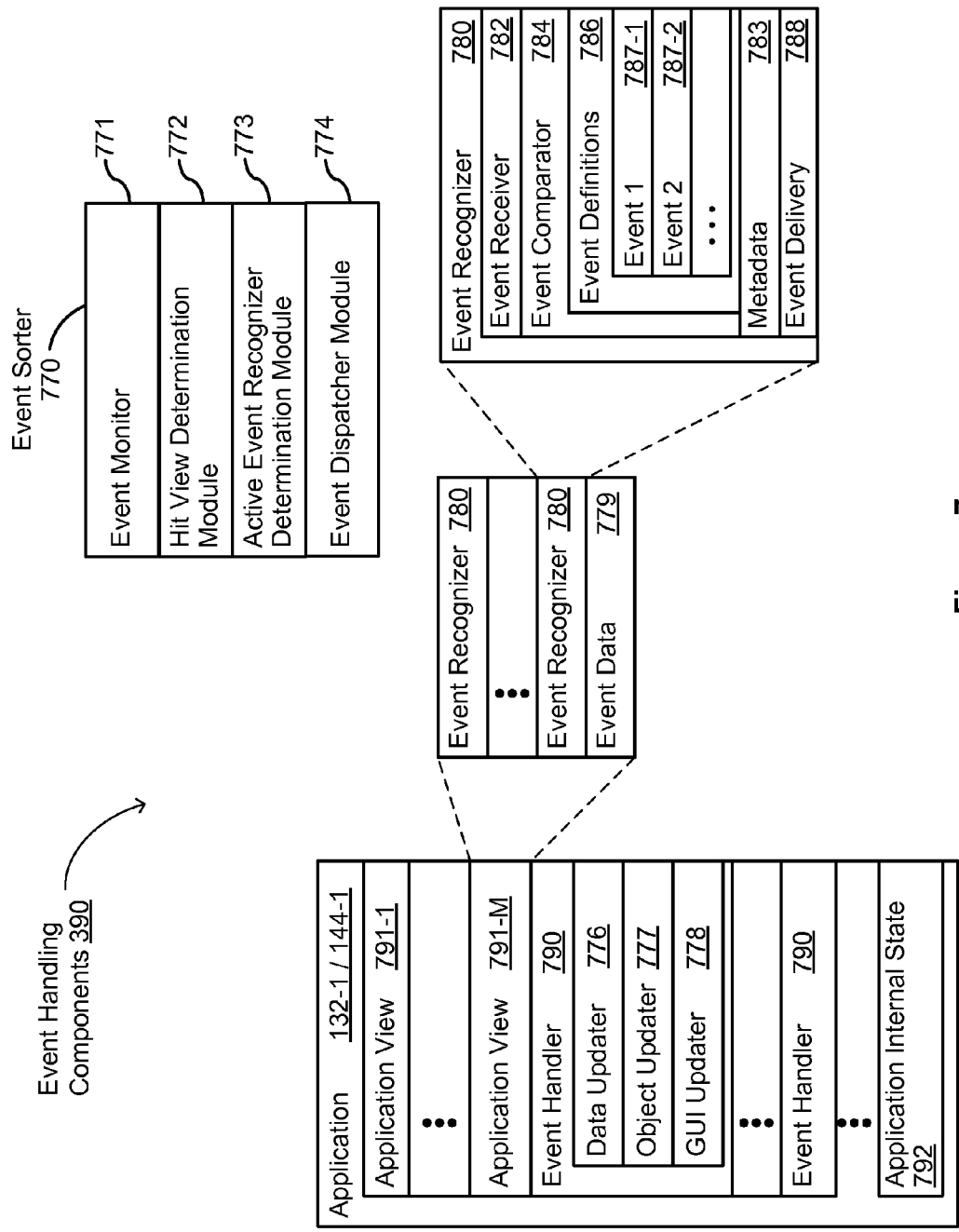
FIG. 7 is a block diagram illustrating exemplary components for event handling in accordance with some embodiments.

FIG. 7 is a block diagram illustrating exemplary components for event handling 390 in accordance with some embodiments. In some embodiments, memory 111 (in FIG. 1) includes event sorter 770 (e.g., in operating system 118) and a respective application 132-1.

Event sorter 770 receives event information and determines the application 132-1 and application view 791 of application 132-1 to which to deliver the event information. Event sorter 770 includes event monitor 771 and event dispatcher module 774. In some embodiments, application 132-1 includes application internal state 792, which indicates the current application view(s) displayed on touch sensitive display 156 when the application is active or executing. In some embodiments, device/global internal state 146 is used by event sorter 770 to determine which application(s) is(are) currently active, and application internal state 792 is used by event sorter 770 to determine application views 791 to which to deliver event information.

In some embodiments, application internal state 792 includes additional information, such as one or more of: resume information to be used when application 132-1 resumes execution, user interface state information that indicates information being displayed or that is ready for display by application 132-1 (which, in turn, may be controlled by an embedded application in document 134), a state queue for enabling the user to go back to a prior state or view of application 132-1, and a redo/undo queue of previous actions taken by the user.

Event monitor 771 receives event information from touch-sensitive display 156 and/or input devices 128. Event information includes information about an event (e.g., a user touch on touch-sensitive display 156, as part of a multi-touch gesture or a motion of device 102) and/or a sub-event (e.g., a movement of a touch across touch-sensitive display 156). For example, event information for a touch event includes one or more of: a location and time stamp of a touch. Similarly, event information for a swipe event includes two or more of: a location, time stamp, direction, and speed of a swipe. Touch-sensitive display 156, and input devices 128 transmit event information and sub-event information to event monitor 771 either directly or through a peripherals interface, which retrieves and stores event information. In some embodiments, the electronic device 102 also includes one or more sensors (not shown), such as proximity sensor, accelerometer(s), gyroscopes, microphone, and video camera, and the sensors transmit information event and sub-event information to event monitor 771.

In some embodiments, event sorter 770 also includes a hit view determination module 772 and/or an active event recognizer determination module 773.

Hit view determination module 772 provides software procedures for determining where a sub-event has taken place within one or more views, when touch sensitive display 156 displays more than one view. Views are made up of controls and other elements (e.g., user interface objects) that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 772 receives information related to sub-events of a touch-based gesture. When an application has multiple views organized in a hierarchy, hit view determination module 772 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 773 determines which view within a view hierarchy should receive a particular sequence of sub-events. In some embodiments, active event recognizer determination module 773 determines that a child region or a parent region of the hit view, or any other region in the view hierarchy related to the hit view should receive a particular sequence of sub-events, when the hit view does not have an event recognizer that is configured to recognize a particular sequence of sub-events. Similarly, active event recognizer determination module 773 repeats the determining operation until active event recognizer determination module 773 identifies a region that has an event recognizer that is configured to recognize a particular sequence of sub-events.

Event dispatcher module 774 dispatches the event information to an event recognizer (e.g., event recognizer 780). In embodiments including active event recognizer determination module 773, event dispatcher module 774 delivers the event information to an event recognizer determined by active event recognizer determination module 773. In some embodiments, event dispatcher module 774 stores in an event queue the event information, which is retrieved by a respective event receiver module 782.

In some embodiments, operating system 126 includes event sorter 770. Alternatively, application 132-1 includes event sorter 770. In yet other embodiments, event sorter 770 is a stand-alone module, or a part of another module stored in memory 102, such as contact/motion module 130.

In some embodiments, application 132-1 includes a plurality of event handlers 790 and one or more application views 791, each of which includes instructions for handling touch events that occur within a respective view of the application's user interface. Each application view 791 of the application 132-1 includes one or more event recognizers 780. Typically, a respective application view 791 includes a plurality of event recognizers 780. In other embodiments, one or more of event recognizers 780 are part of a separate module, such as a user interface kit (not shown) or a higher level object from which application 132-1 inherits methods and other properties. In some embodiments, a respective event handler 790 includes one or more of: data updater 776, object updater 777, GUI updater 778, and/or event data 779 received from event sorter 770. Event handler 790 may utilize or call data updater 776, object updater 777 or GUI updater 778 to update the application internal state 792. Alternatively, one or more of the application views 791 includes one or more respective event handlers 790. Also, in some embodiments, one or more of data updater 776, object updater 777, and GUI updater 778 are included in a respective application view 791.

A respective event recognizer 780 receives event information (e.g., event data 779) from event sorter 770, and identifies an event from the event information. Event recognizer 780 includes event receiver 782 and event comparator 784. In some embodiments, event recognizer 780 also includes at least a subset of: metadata 783, and event delivery instructions 788 (which may include sub-event delivery instructions).

Event receiver 782 receives event information from event sorter 770. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 784 compares the event information to predefined event or sub-event definitions and, based on the comparison, determines an event or sub-event, or determines or updates the state of an event or sub-event. In some embodiments, event comparator 784 includes event definitions 786. Event definitions 786 contain definitions of events (e.g., predefined sequences of sub-events), for example, event 1 (787-1), event 2 (787-2), and others. In some embodiments, sub-events in an event 787 include, for example, touch begin, touch end, touch movement, touch cancellation, and multiple touching. In one example, the definition for event 1 (787-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (787-2) is a dragging on a displayed object. The dragging, for example, comprises a touch (or contact) on the displayed object for a predetermined phase, a movement of the touch across touch-sensitive display 156, and lift-off of the touch (touch end). In some embodiments, the event also includes information for one or more associated event handlers 790.

In some embodiments, event definition 787 includes a definition of an event for a respective user-interface object. In some embodiments, event comparator 784 performs a hit test to determine which user-interface object is associated with a sub-event. For example, in an application view in which three user-interface objects are displayed on touch-sensitive display 156, when a touch is detected on touch-sensitive display 156, event comparator 784 performs a hit test to determine which of the three user-interface objects is associated with the touch (sub-event). If each displayed object is associated with a respective event handler 790, the event comparator uses the result of the hit test to determine which event handler 790 should be activated. For example, event comparator 784 selects an event handler associated with the sub-event and the object triggering the hit test.

In some embodiments, the definition for a respective event 787 also includes delayed actions that delay delivery of the event information until after it has been determined whether the sequence of sub-events does or does not correspond to the event recognizer's event type.

When a respective event recognizer 780 determines that the series of sub-events do not match any of the events in event definitions 786, the respective event recognizer 780 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 780 includes metadata 783 with configurable properties, flags, and/or lists that indicate how the event delivery system should perform sub-event delivery to actively involved event recognizers. In some embodiments, metadata 783 includes configurable properties, flags, and/or lists that indicate how event recognizers may interact with one another. In some embodiments, metadata 783 includes configurable properties, flags, and/or lists that indicate whether sub-events are delivered to varying levels in the view or programmatic hierarchy.

In some embodiments, a respective event recognizer 780 activates event handler 790 associated with an event when one or more particular sub-events of an event are recognized. In some embodiments, a respective event recognizer 780 delivers event information associated with the event to event handler 790. Activating an event handler 790 is distinct from sending (and deferred sending) sub-events to a respective hit view. In some embodiments, event recognizer 780 throws a flag associated with the recognized event, and event handler 790 associated with the flag catches the flag and performs a predefined process.

In some embodiments, event delivery instructions 788 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, event handler(s) 790 includes or has access to data updater 776, object updater 777, and GUI updater 778. In some embodiments, data updater 776, object updater 777, and GUI updater 778 are included in a single module of a respective application 132-1 or application view 791. In other embodiments, they are included in two or more software modules. In some embodiments, data updater 776 creates and updates data used in application 132-1. In some embodiments, object updater 777 creates and updates objects used in application 132-1. GUI updater 778 updates the GUI.

It shall be understood that the foregoing discussion regarding event handling of user touches on touch-sensitive displays also applies to other forms of user inputs to operate electronic devices 102 with input-devices, not all of which are initiated on touch screens, e.g., coordinating mouse movement and mouse button presses with or without single or multiple keyboard presses or holds, user movements such as taps, drags, scrolls, etc., on touch-pads, pen stylus inputs, movement of the device, oral instructions, detected eye movements, biometric inputs, and/or any combination thereof, which may be utilized as inputs corresponding to events and/or sub-events which define an event to be recognized.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at an electronic device with a touch-sensitive display:
        displaying on the touch-sensitive display a user interface of an application, the displayed user interface including a plurality of regions that are arranged in multiple hierarchical levels, the plurality of regions including a respective region at a respective hierarchy level, the respective region having two or more child regions at a hierarchy level below the respective hierarchy level;
        detecting on the touch-sensitive display a first contact at a first location that corresponds to the respective region and that does not correspond to any of the two or more child regions of the respective region;
        in response to detecting the first contact, determining whether the application is configured to process the first contact in conjunction with the respective region;
        in accordance with a determination that the application is not configured to process the first contact in conjunction with the respective region:
            determining whether the application is configured to process the first contact in conjunction with at least one child region of the two or more child regions of the respective region;
            in accordance with a determination that the application is configured to process the first contact in conjunction with at least one child region of the two or more child regions of the respective region:
                identifying a respective child region, of the two or more child regions of the respective region, in accordance with positions of the child regions relative to the first location; and
                processing the first contact in conjunction with the identified respective child region using the application.

2. The method of claim 1, including, in accordance with a determination that the application is configured to process the first contact in conjunction with the respective region, processing the first contact in conjunction with the respective region using the application.

3. The method of claim 1, wherein respective child regions of the two or more child regions have respective hit regions, at least one of which is different from the corresponding child region, and the detecting includes determining that the first location does not correspond to any of the respective hit regions of the child regions.

4. The method of claim 1, wherein the first location is located outside any of the two or more child regions of the respective region.

5. The method of claim 1, wherein the respective region has a parent region at a hierarchy level above the respective hierarchy level.

6. The method of claim 5, including, in accordance with a determination that the application is not configured to process the first contact in conjunction with at least one child region of the two or more child regions of the respective region, and the application is configured to process the first contact in conjunction with the parent region, processing the first contact in conjunction with the parent region using the application.

7. The method of claim 5, including, in accordance with a determination that the application is not configured to process the first contact in conjunction with at least one child region of the two or more child regions of the respective region, processing the first contact as a contact in the parent region.

8. The method of claim 1, wherein identifying the respective child region, of the two or more child regions of the respective region, in accordance with positions of the child regions relative to the first location includes identifying the child region, of the two or more child regions of the respective region, that best satisfies a proximity criterion with respect to the first location.

9. The method of claim 1, wherein identifying the respective child region, of the two or more child regions of the respective region, in accordance with positions of the child regions relative to the first location includes identifying the child region, of the two or more child regions of the respective region, that best satisfies a proximity criterion with respect to the first location, and confirming that the identified child region satisfies a maximum distance limit with respect to the first location.

10. The method of claim 1, wherein one or more child regions of the two or more child regions has a predefined approximation property and at least one other child region does not have the predefined approximation property; and identifying the respective child region includes identifying a respective child region, of the one or more child regions of the respective region that have the predefined approximation property, in accordance with positions of the child regions relative to the first location.

11. The method of claim 1, wherein the application is deemed to be configured to process the first contact in conjunction with the respective region in accordance with a determination that the respective region includes a user interface object having at least one property in a predefined set of properties.

12. The method of claim 1, wherein the application is deemed to be configured to process the first contact in conjunction with the respective region in accordance with a determination that the respective region comprises a user interface object that is configured to be activated in response to a gesture that includes the first contact.

13. The method of claim 1, wherein the application is deemed to be configured to process the first contact in conjunction with the respective region in accordance with a determination that at least one event recognizer is associated with the respective region.

14. The method of claim 1, wherein the application is deemed to be configured to process the first contact in conjunction with the respective region in accordance with a determination that an event recognizer configured to recognize a gesture that includes the first contact is associated with the respective region.

15. The method of claim 1, wherein the plurality of regions comprises a plurality of hierarchically arranged views corresponding to the regions, each of the plurality of the views having at least one event recognizer associated with the respective view; and processing the first contact in conjunction with the identified respective child region using the application comprises generating an event to be processed by at least one event recognizer of the view corresponding to the identified respective child region.

16. The method of claim 1, wherein the plurality of regions comprises a plurality of hierarchically arranged views corresponding to the regions; and processing the first contact in conjunction with the identified respective child region using the application comprises processing the first contact as a contact in the identified respective child region.

17. An electronic device comprising a touch-sensitive display, one or more processors, and memory storing one or more programs for execution by the one or more processors, the one or more programs including instructions for:
  displaying on the touch-sensitive display a user interface of an application, the displayed user interface including a plurality of regions that are arranged in multiple hierarchical levels, the plurality of regions including a respective region at a respective hierarchy level, the respective region having two or more child regions at a hierarchy level below the respective hierarchy level;
  detecting on the touch-sensitive display a first contact at a first location that corresponds to the respective region and that does not correspond to any of the two or more child regions of the respective region;
  in response to detecting the first contact, determining whether the application is configured to process the first contact in conjunction with the respective region;
  in accordance with a determination that the application is not configured to process the first contact in conjunction with the respective region:
    determining whether the application is configured to process the first contact in conjunction with at least one child region of the two or more child regions of the respective region;
    in accordance with a determination that the application is configured to process the first contact in conjunction with at least one child region of the two or more child regions of the respective region:
      identifying a respective child region, of the two or more child regions of the respective region, in accordance with positions of the child regions relative to the first location; and
      processing the first contact in conjunction with the identified respective child region using the application.

18. The electronic device of claim 17, wherein the one or more programs include instructions for, in accordance with a determination that the application is configured to process the first contact in conjunction with the respective region, processing the first contact in conjunction with the respective region using the application.

19. The electronic device of claim 17, wherein the respective region has a parent region at a hierarchy level above the respective hierarchy level.

20. The electronic device of claim 19, wherein the one or more programs include instructions for, in accordance with a determination that the application is not configured to process the first contact in conjunction with at least one child region of the two or more child regions of the respective region, and the application is configured to process the first contact in conjunction with the parent region, processing the first contact in conjunction with the parent region using the application.

21. The electronic device of claim 19, wherein the one or more programs include instructions for, in accordance with a determination that the application is not configured to process the first contact in conjunction with at least one child region of the two or more child regions of the respective region, processing the first contact as a contact in the parent region.

22. The electronic device of claim 17, wherein the instructions for identifying the respective child region, of the two or more child regions of the respective region, in accordance with positions of the child regions relative to the first location include instructions for identifying the child region, of the two or more child regions of the respective region, that best satisfies a proximity criterion with respect to the first location.

23. The electronic device of claim 17, wherein the plurality of regions comprises a plurality of hierarchically arranged views corresponding to the regions, each of the plurality of the views having at least one event recognizer associated with the respective view; and the instructions for processing the first contact in conjunction with the identified respective child region using the application comprise instructions for generating an event to be processed by at least one event recognizer of the view corresponding to the identified respective child region.

24. A non-transitory computer readable storage medium storing one or more programs for execution by one or more processors in an electronic device with a touch-sensitive display, the one or more programs including instructions for:
  displaying on the touch-sensitive display a user interface of an application, the displayed user interface including a plurality of regions that are arranged in multiple hierarchical levels, the plurality of regions including a respective region at a respective hierarchy level, the respective region having two or more child regions at a hierarchy level below the respective hierarchy level;
  detecting on the touch-sensitive display a first contact at a first location that corresponds to the respective region and that does not correspond to any of the two or more child regions of the respective region;

in response to detecting the first contact, determining whether the application is configured to process the first contact in conjunction with the respective region;

in accordance with a determination that the application is not configured to process the first contact in conjunction with the respective region:

determining whether the application is configured to process the first contact in conjunction with at least one child region of the two or more child regions of the respective region;

in accordance with a determination that the application is configured to process the first contact in conjunction with at least one child region of the two or more child regions of the respective region:

identifying a respective child region, of the two or more child regions of the respective region, in accordance with positions of the child regions relative to the first location; and processing the first contact in conjunction with the identified respective child region using the application.

25. The computer readable storage medium of claim 24, wherein the one or more programs include instructions for, in accordance with a determination that the application is configured to process the first contact in conjunction with the respective region, processing the first contact in conjunction with the respective region using the application.

26. The computer readable storage medium of claim 24, wherein the respective region has a parent region at a hierarchy level above the respective hierarchy level.

27. The computer readable storage medium of claim 26, wherein the one or more programs include instructions for, in accordance with a determination that the application is not configured to process the first contact in conjunction with at least one child region of the two or more child regions of the respective region, and the application is configured to process the first contact in conjunction with the parent region, processing the first contact in conjunction with the parent region using the application.

28. The computer readable storage medium of claim 26, wherein the one or more programs include instructions for, in accordance with a determination that the application is not configured to process the first contact in conjunction with at least one child region of the two or more child regions of the respective region, processing the first contact as a contact in the parent region.

29. The computer readable storage medium of claim 24, wherein the instructions for identifying the respective child region, of the two or more child regions of the respective region, in accordance with positions of the child regions relative to the first location include instructions for identifying the child region, of the two or more child regions of the respective region, that best satisfies a proximity criterion with respect to the first location.

30. The computer readable storage medium of claim 24, wherein the plurality of regions comprises a plurality of hierarchically arranged views corresponding to the regions, each of the plurality of the views having at least one event recognizer associated with the respective view; and the instructions for processing the first contact in conjunction with the identified respective child region using the application comprise instructions for generating an event to be processed by at least one event recognizer of the view corresponding to the identified respective child region.

* * * * *